United States Patent
Stuler

(10) Patent No.: US 9,893,634 B2
(45) Date of Patent: Feb. 13, 2018

(54) HYBRID CONTROL TECHNIQUE FOR POWER CONVERTERS

(71) Applicant: SEMICONDUCTOR COMPONENTS INDUSTRIES, LLC, Phoenix, AZ (US)

(72) Inventor: Roman Stuler, Karolinka (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 22 days.

(21) Appl. No.: 15/148,200

(22) Filed: May 6, 2016

(65) Prior Publication Data
US 2017/0324345 A1   Nov. 9, 2017

(51) Int. Cl.
*H02M 3/335*   (2006.01)
*H02M 1/08*    (2006.01)
*H02M 1/00*    (2006.01)

(52) U.S. Cl.
CPC ......... *H02M 3/33553* (2013.01); *H02M 1/08* (2013.01); *H02M 2001/0009* (2013.01)

(58) Field of Classification Search
CPC ............. H02M 3/33569; H02M 3/335; H02M 3/33507; H02M 2007/4815; H02M 1/083; H02M 3/3353; H02M 1/32; H02M 3/33523; H02M 7/48; H02M 3/315; H02M 7/515; H02M 7/537; H02M 7/5387; H02M 7/53871
USPC ...... 363/17, 20, 21.01, 21.02, 21.03, 58, 95, 363/97, 98, 131, 132
See application file for complete search history.

(56) References Cited

U.S. PATENT DOCUMENTS

| | | | | |
|---|---|---|---|---|
| 5,111,131 A | * | 5/1992 | Somerville | H02J 7/022 320/160 |
| 8,098,502 B2 | * | 1/2012 | Mao | H02M 1/44 363/21.03 |
| 8,391,027 B2 | | 3/2013 | Lidak et al. | |
| 9,572,219 B1 | * | 2/2017 | Dickey | H05B 33/0851 |

(Continued)

OTHER PUBLICATIONS

Infineon Technologies, AG, "ICE2HS01G High Performance Resonant Mode Controller," ICE2HS01G Datasheet, Version 21, May 14, 2011, 29 pages.

(Continued)

*Primary Examiner* — Adolf Berhane
(74) *Attorney, Agent, or Firm* — Robert D. Atkins; Patent Law Group: Atkins and Associates, P.C.

(57) ABSTRACT

A power conversion circuit includes a high-side MOSFET and a low-side MOSFET. A conduction terminal of the high-side MOSFET is coupled to a conduction terminal of the low-side MOSFET at a half-bridge (HB) circuit node. The high-side MOSFET is switched off. Voltage potential transitions of the HB circuit node are counted while the high-side MOSFET and low-side MOSFET are off. Assertion of a control signal to the low-side MOSFET is postponed for two voltage potential transitions of the HB circuit node after the high-side MOSFET is switched off. The low-side MOSFET is switched off by de-asserting the control signal to the low-side MOSFET. Switching on the high-side MOSFET is postponed for two voltage potential transitions of the HB circuit node after switching off the low-side MOSFET.

20 Claims, 13 Drawing Sheets

(56) References Cited

U.S. PATENT DOCUMENTS

| | | | |
|---|---|---|---|
| 2013/0135905 A1* | 5/2013 | Yeh | H02M 3/33507 363/21.01 |
| 2014/0371931 A1* | 12/2014 | Lin | H02S 10/00 700/287 |
| 2015/0091463 A1* | 4/2015 | Jin | H05B 33/0809 315/201 |
| 2015/0194896 A1 | 7/2015 | Stuler et al. | |
| 2016/0190912 A1* | 6/2016 | Lim | G01R 21/006 363/84 |
| 2017/0085183 A1* | 3/2017 | Notsch | H02M 3/33507 |
| 2017/0149361 A1* | 5/2017 | Feng | H02N 2/181 |

OTHER PUBLICATIONS

ON Semiconductor, "Quasi-Resonant Current-Mode Controller for High-Power Universal Off-Line Supplies," NCP1380 Datasheet, Dec. 2013, Rev. 5, 26 pages.

ON Semiconductor, "High Performance Resonant Mode Controller with Integrated High-Voltage Drivers," NCP1397A/B, NCV1397A/B Datasheet, Oct. 2015, Rev. 6, 27 pages.

ON Semiconductor, High Performance Current Mode Resonant Controller with Integrated High-Voltage Drivers, NCP1399AA, NCP1399BA, NCP1399AC, NCP1399AF Datasheet, Feb. 2016, Rev. 4, 44 pages.

NXP Semiconductors, "Digital controller for high-efficiency resonant power supply," TEA19161T Datasheet, Mar. 10, 2016, Rev. 1, 46 pages.

STMicroelectronics, "Enhanced high-voltage resonant controller," DAP020A Datasheet, Feb. 2013, Rev. 1, 40 pages.

* cited by examiner

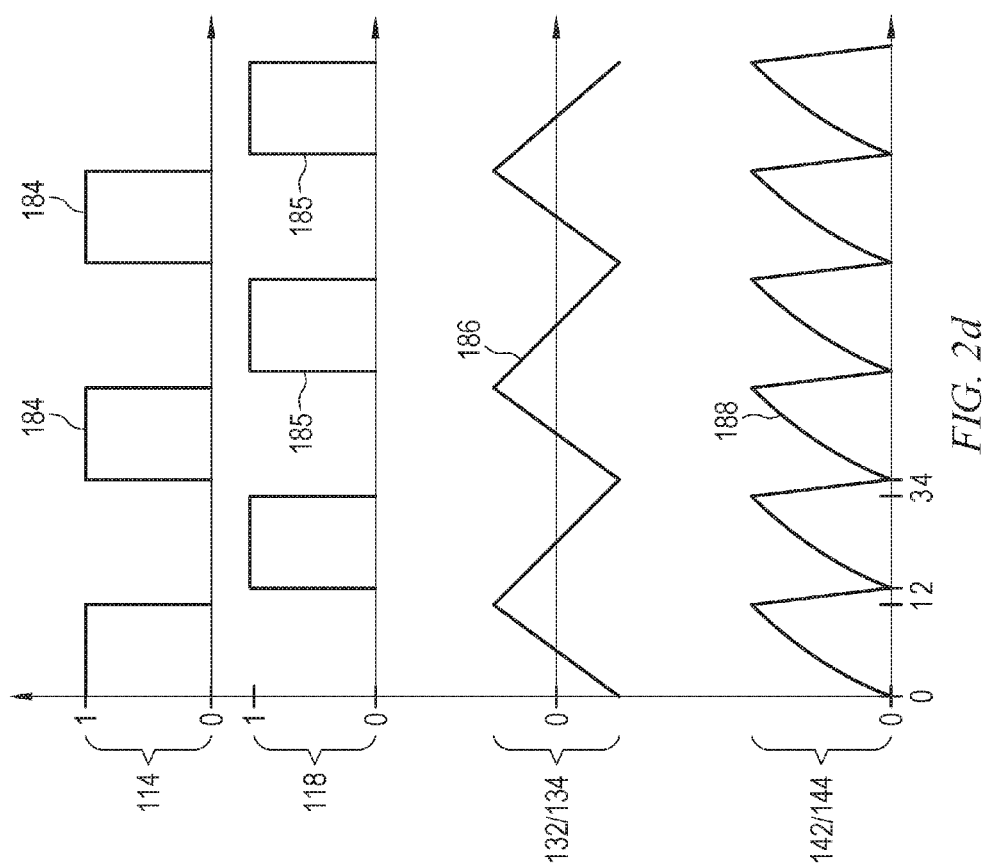

US 9,893,634 B2

HYBRID CONTROL TECHNIQUE FOR POWER CONVERTERS

BACKGROUND

Semiconductor devices are commonly found in modern electronic products. Semiconductor devices vary in the number and density of electrical components. Discrete semiconductor devices generally contain one type of electrical component, e.g., light emitting diode (LED), small signal transistor, resistor, capacitor, inductor, and power metal-oxide-semiconductor field-effect transistor (MOSFET). Integrated semiconductor devices typically contain hundreds to millions of electrical components. Examples of integrated semiconductor devices include microcontrollers, microprocessors, and various signal processing circuits.

Semiconductor devices perform a wide range of functions such as signal processing, high-speed calculations, transmitting and receiving electromagnetic signals, controlling electronic devices, transforming sunlight to electricity, and creating visual images for television displays. Semiconductor devices are found in the fields of entertainment, communications, power conversion, networks, computers, and consumer products. Semiconductor devices are also found in military applications, aviation, automotive, industrial controllers, and office equipment.

FIG. 1 illustrates electronic device 50 having a chip carrier substrate or printed circuit board (PCB) 52 with a plurality of semiconductor packages mounted on a surface of the PCB. Electronic device 50 can have one type of semiconductor package, or multiple types of semiconductor packages, depending on the application. Different types of semiconductor packages are shown in FIG. 1 for purposes of illustration.

Electronic device 50 can be a stand-alone system that uses the semiconductor packages to perform one or more electrical functions. Alternatively, electronic device 50 can be a subcomponent of a larger system. For example, electronic device 50 can be part of a tablet, cellular phone, digital camera, television, power supply, or other electronic device. Electronic device 50 can also be a graphics card, network interface card, or other expansion card that is inserted into a personal computer. The semiconductor packages can include microprocessors, memories, application specific integrated circuits (ASIC), programmable logic circuits, analog circuits, radio frequency (RF) circuits, discrete devices, or other semiconductor die or electrical components.

In FIG. 1, PCB 52 provides a general substrate for structural support and electrical interconnect of the semiconductor packages mounted on the PCB. Conductive signal traces 54 are formed over a surface or within layers of PCB 52 using evaporation, electrolytic plating, electroless plating, screen printing, or another suitable metal deposition process. Signal traces 54 provide for electrical communication between each of the semiconductor packages, mounted components, and other external system components. Traces 54 also provide power and ground connections to each of the semiconductor packages. A clock signal is transmitted between semiconductor packages via traces 54 in some embodiments.

For the purpose of illustration, several types of first level packaging, including bond wire package 56 and flipchip 58, are shown on PCB 52. Additionally, several types of second level packaging, including ball grid array (BGA) 60, bump chip carrier (BCC) 62, land grid array (LGA) 66, multi-chip module (MCM) 68, quad flat non-leaded package (QFN) 70, quad flat package 72, embedded wafer level ball grid array (eWLB) 74, and wafer level chip scale package (WLCSP) 76 are shown mounted on PCB 52. Depending upon the system requirements, any combination of semiconductor packages, configured with any combination of first and second level packaging styles, as well as other electronic components, can be connected to PCB 52.

A manufacturer of electronic device 50 provides for a power signal to be connected to the electronic device, which is used to power the semiconductor packages and other devices disposed on PCB 52. In many cases, the provided power signal is at a different voltage potential than the voltage required to operate the individual semiconductor devices. The manufacturer will generally provide a power converter circuit on PCB 52 to generate a steady direct current (DC) voltage signal at a voltage potential usable by the individual semiconductor packages. One topology that is commonly used for medium and high power converters is the series LLC resonant mode converter, which is a type of switch-mode power supply (SMPS).

A circuit diagram for one exemplary embodiment of an LLC resonant mode converter as SMPS 100 is illustrated in FIG. 2a. SMPS 100 has a primary side 102 and a secondary side 104. Primary side 102 includes a voltage source 106, which is a DC voltage source. In one embodiment, voltage source 106 is an AC main line distributed by a power company or municipality to a power outlet at a user's home or office that is rectified to DC, e.g., by a diode bridge. Voltage source 106 is coupled between ground node 108 and input voltage ($V_{IN}$) node 110. Primary side 102 also has upper or high-side MOSFET 112 with a drain terminal coupled to $V_{IN}$ node 110, a gate terminal 114, and a source terminal coupled to lower or low-side MOSFET 116 at half-bridge (HB) node 122. Low-side MOSFET 116 includes a drain terminal coupled to the source terminal of high-side MOSFET 112 at HB node 122, a gate terminal 118, and a source terminal coupled to ground node 108. MOSFET 112 is referred to as a high-side MOSFET because MOSFET 112 couples HB node 122 to a higher voltage potential at $V_{IN}$ node 110 when MOSFET 112 is turned on. MOSFET 116 is referred to as a low-side MOSFET because MOSFET 116 couples HB node 122 to a lower, or ground, voltage potential at circuit node 108 when MOSFET 116 is turned on.

Primary side 102 of SMPS 100 includes resonant inductor 128, resonant capacitor 136, and the primary side of transformer 130, including primary winding 132 and magnetizing inductance 134, coupled in series between HB node 122 and ground node 108. Resonant inductor 128, primary winding 132, magnetizing inductance 134, and resonant capacitor 136 form an LLC tank for SMPS 100. Controller 120 drives the LLC resonant tank formed by resonant inductor 128, primary winding 132, magnetizing inductance 134, and resonant capacitor 136 by turning MOSFETs 112 and 116 on and off alternatively using control signals provided to gates 114 and 118. Controller 120 turns high-side MOSFET 112 on by applying a positive voltage at gate terminal 114, and turns high-side MOSFET 112 off by applying a ground voltage potential to gate terminal 114. Controller 120 turns low-side MOSFET 116 on by applying a positive voltage at gate terminal 118, and turns low-side MOSFET 116 off by applying a ground voltage potential to gate terminal 118.

MOSFETs 112 and 116 are n-channel MOSFETs, indicating that negative carriers, or electrons, are the majority carrier for electric current through the MOSFETs. In other embodiments, p-channel MOSFETs are used that have positive electron holes as the majority carrier. An n-channel MOSFET provides low electrical resistance between a drain terminal and a source terminal of the n-channel MOSFET when a voltage potential of a gate terminal is sufficiently high. With the gate of the MOSFET at ground potential, or at least below a threshold, a larger electrical resistance is exhibited between the drain and source of the MOSFET.

In the ideal case, an n-channel MOSFET exhibits zero resistance when its gate has a positive voltage potential, and exhibits infinite resistance when its gate is at ground potential. MOSFETs 112 and 116 operate as switches which are opened and closed by control signals from controller 120 coupled to the MOSFETs' respective gates. A switch, e.g., MOSFETs 112 and 116, being closed is also referred to as the switch being "on," because electric current is able to flow between terminals of the switch. An open switch is referred to as being "off" because current does not flow significantly between terminals of the switch. While the switches of SMPS 100 are illustrated as MOSFETs, other types of electronically controlled switches, e.g., bipolar-junction transistors (BJTs), are used in other embodiments. MOSFETs include source and drain terminals, which are conduction terminals, and a gate terminal as a control terminal. BJTs include emitter and collector terminals, which are conduction terminals, and a base terminal as a control terminal.

When high-side MOSFET 112 is on and low-side MOSFET 116 is off, HB node 122 is coupled to voltage source 106 at $V_{IN}$ node 110 through high-side MOSFET 112. When low-side MOSFET 116 is on and high-side MOSFET 112 is off, HB node 122 is coupled to ground node 108 through low-side MOSFET 116. Controller 120 alternates switching of MOSFETs 112 and 116, which causes the voltage potential at HB node 122 to alternate between the voltage potentials of voltage source 106 and ground node 108. The pulsating voltage potential at HB node 122 causes resonant inductor 128, primary winding 132, magnetizing inductance 134, and resonant capacitor 136 to resonate.

Magnetizing inductance 134 is not an actual physical inductor, but is used in analysis to represent a portion of current through transformer 130 that is used to magnetize core 137. Energy is transferred from primary winding 132 to secondary winding 138 through magnetic coupling. A certain percentage of the power input to transformer 130, analyzed as the current through magnetizing inductance 134, is lost in core 137 because the core does not have a perfectly efficient magnetic response.

As HB node 122 toggles between the voltage potentials of ground node 108 and $V_{IN}$ node 110, power is transferred from primary winding 132 to secondary winding 138. A circuit node 152 is connected to secondary winding 138 as a center-tap. The center-tap of circuit node 152 provides a ground potential circuit node for secondary side 104. A secondary winding portion 138a is coupled between center tapped ground node 152 and diode 142, while secondary winding portion 138b is coupled between center tapped ground node 152 and diode 144. Diodes 142 and 144 rectify the current through secondary winding 138. Capacitor 146 is coupled between output voltage ($V_{OUT}$) node 150 and ground node 152 to filter the output voltage to a relatively steady DC voltage.

As power is transferred from primary side 102 to secondary side 104 through transformer 130, the voltage potential at $V_{OUT}$ node 150 rises to charge capacitor 146 and power a load connected between $V_{OUT}$ node 150 and ground node 152. Feedback is provided to controller 120 from secondary side 104 via Zener diode 154, LED 156, and phototransistor 158 coupled between $V_{OUT}$ node 150 and feedback (FB) node 160. LED 156 and phototransistor 158 form an optocoupler to maintain galvanic isolation between primary side 102 and secondary side 104. Isolation is provided for FB node 160 with other methods in other embodiments. Once the voltage potential at $V_{OUT}$ node 150 rises above the Zener voltage of Zener diode 154 summed with the turn-on voltage of LED 156, current flows from $V_{OUT}$ node 150 to ground node 152 through Zener diode 154 and LED 156 in series. Light photons emitted by LED 156 impact phototransistor 158, which increases coupling of FB node 160 to ground node 108 through the phototransistor. Controller 120 uses FB node 160 to reduce power transfer across transformer 130 when the voltage at $V_{OUT}$ node 150 rises above a desired threshold.

FIG. 2b illustrates timing of voltages and currents at various circuit nodes of SMPS 100 through a full power transfer cycle. Time is illustrated on the X, or horizontal, axis, and voltage or current magnitude is illustrated on the Y, or vertical, axis. Time is not labelled in units of time, but rather to distinguish between modes of operation of SMPS 100.

Signal 164 in FIG. 2b represents a signal generated by controller 120 and routed to gate 114 of high-side MOSFET 112. Signal 164 transitions from logic zero to logic one, or from ground voltage to a positive voltage, at time zero. Signal 164 at a positive voltage turns on high-side MOSFET 112, which couples HB node 122 to voltage source 106 at $V_{IN}$ node 110. Signal 164 returns to a logic zero, or ground potential, at time 2.

Signal 165 in FIG. 2b represents a signal generated by controller 120 and routed to gate 118 of low-side MOSFET 116. After a dead-time period where both MOSFETs 112 and 116 are off, signal 165 transitions from a logic zero to a logic one at time 3, and returns to logic zero at time 5. Signal 165 at a positive voltage potential turns on low-side MOSFET 116, which couples HB node 122 to ground node 108.

Primary current 166 in FIG. 2b is the total current through the primary side of transformer 130, i.e., the current through magnetizing inductance 134 summed with the current through primary winding 132. Magnetizing current 167 is the current through magnetizing inductance 134 that is used to magnetize core 137 of transformer 130. Beginning at time zero, currents 166 and 167 increase from negative values to positive values due to coupling to positive voltage at $V_{IN}$ node 110 through high-side MOSFET 112. The arc of primary current 166 illustrates resonance between resonant capacitor 136 and resonant inductor 128. Prior to time 1, while primary current 166 is negative, the body diode of high-side MOSFET 112 conducts and allows signal 164 to turn on high-side MOSFET 112 under zero voltage switching (ZVS) conditions.

The difference between total primary current 166 and magnetizing current 167 is transferred to secondary winding 138. The reflected current in secondary winding 138 is illustrated as secondary current 168 in FIG. 2b. Secondary current 168 is determined based on a difference between primary current 166 and magnetizing current 167. The magnetizing current 167 portion of primary current 166 is used to magnetize core 137, while the remaining portion of primary current 166 is reflected as secondary current 168. Secondary current 168 is only illustrated as including positive values because negative current is rectified to positive voltage at circuit node 150 by diodes 142 and 144.

At time 2, signal 164 returns to ground voltage potential, switching off high-side MOSFET 112. Currents 166 and 167 reverse direction and the body diode of low-side MOSFET 116 conducts to ground node 108. Currents 166 and 167 fall from a positive value to a negative value due to the coupling to ground node 108, mirroring the currents between time 0 and time 2. Signal 165 turns on low-side MOSFET 116 at time 3, while primary current 166 remains positive, to achieve ZVS. Secondary current 168 includes a positive pulse between time 3 and time 5 because of rectification by diodes 142 and 144. Secondary current 168, which flows through either diode 142 or diode 144 to $V_{OUT}$ node 150, charges capacitor 146 and powers a load attached between $V_{OUT}$ node 150 and ground node 152.

Resonant mode converters, such as SMPS 100, commonly control output voltage across a varying load by modifying the switching frequency, which is referred to as frequency modulation mode. FIG. 2c illustrates SMPS 100 operating at a higher frequency to reduce output current at a lighter load. High-side MOSFET 112 is operated by control signal 174 from controller 120 to gate terminal 114, which has a shorter pulse-width than control signal 164 in FIG. 2b. Low-side MOSFET 116 is operated by control signal 175 from controller 120 to gate terminal 118, which has a shorter pulse-width than control signal 165 in FIG. 2b. The shorter on-times of MOSFETs 112 and 116 cut off primary current 176 through primary winding 132 before the primary current reaches the resonant peak seen with primary current 166 in FIG. 2b. With a lower magnitude electric current through primary winding 132, less energy is transferred from primary side 102 to secondary side 104 each SMPS 100 power cycle. Secondary current 178 in FIG. 2c illustrates the electric current through either of diodes 142 and 144 to $V_{OUT}$ node 150. Secondary current 178 is cut off at time 1 when control signal 174 switches off high-side MOSFET 112, and at time 3 when control signal 175 turns off low-side MOSFET 116, rather than continuing to rise as in FIG. 2b.

FIG. 2d illustrates power transfer through transformer 130 reduced further compared to FIG. 2c by increasing switching frequency relative to FIG. 2c. Control signal 184 to high-side MOSFET 112 has a shorter pulse-width than control signal 174. Control signal 185 to low-side MOSFET 116 has a shorter pulse-width than control signal 175. Primary current 186 through primary winding 132 includes a lower magnitude because the shorter pulse-widths of control signals 184 and 185 cut off the primary current earlier in the power cycle while the primary current is increasing. The pulses of secondary current 188 are similarly shorter and peak at a lower magnitude than secondary current 178 in FIG. 2c.

Increasing switching frequency to reduce power transfer at lighter loads is useful for a range of relatively high output currents. However, as the magnitude of electric current through primary winding 132 is reduced further, the efficiency losses due to magnetizing current through magnetizing inductance 134 constitutes a larger portion of the overall power losses of SMPS 100. With only a frequency modulation scheme, as is demonstrated in FIGS. 2b-2d, efficiency drops significantly under light loads. Plot 190 in FIG. 2e illustrates efficiency of SMPS 100 over a range of output currents in one embodiment. Plot 190 demonstrates that efficiency of SMPS 100 is relatively steady when output current remains between 5 and 20 amperes. However, plot 190 also shows that efficiency is significantly reduced as output current is reduced when output current drops below 5 amps.

One traditional solution to improving efficiency is to implement a burst or skip mode under light load conditions. Once a voltage potential of FB node 160 reaches a skip mode turn-on threshold, SMPS 100 enters skip mode. Controller 120 stops switching MOSFETs 112 and 116, and both MOSFETs remain off while skip mode is enabled. Both high-side MOSFET 112 and low-side MOSFET 116 remain off, and the voltage potential at $V_{OUT}$ node 150 decays. As output voltage decays, the voltage potential of FB node 160 drifts until the feedback voltage reaches a skip mode turn-off threshold, then controller 120 resumes switching MOSFETs 112 and 116.

FIG. 2f illustrates SMPS 100 entering skip mode. Control signal 195 shows the final pulse from controller 120 turning on MOSFET 116 between time 1 and time 2, just prior to entering skip mode. The pulse of control signal 195 to gate terminal 118 couples HB node 122 to ground node 108 between time 1 and time 2 in FIG. 2f. Signal 199 in FIG. 2f illustrates the voltage potential of HB node 122. SMPS 100 is in skip mode after time 2, which means that controller 120 does not turn on either of MOSFETs 112 and 116. HB node 122 floats along with resonant oscillations of primary winding 132, resonant inductor 128, and resonant capacitor 136.

Positive, or rising, transitions of HB node 122 occur at times when the voltage potential of HB node 122 moves from approximately ground potential to approximately the voltage potential of $V_{IN}$ node 110. Negative, or falling transitions of HB node 122 occur at times when the voltage potential of HB node 122 moves from approximately $V_{IN}$ 110 to approximately ground potential. The voltage swings of HB node 122 are considered rising and falling transitions between peaks and valleys even when the voltage potentials of ground node 108 and $V_{IN}$ node 110 are not reached.

Signal 199 diminishes over time because controller 120 does not enable high-side MOSFET 112 or low-side MOSFET 116 to input additional energy into the resonant system. When the voltage potential of FB node 160 subsequently drifts across the skip mode turn-off threshold, SMPS exits skip mode and begins switching MOSFETs 112 and 116 again. The voltage potential at HB node 122 is unknown when controller 120 begins switching MOSFETs 112 and 116 again. Controller 120 switches on low-side MOSFET 116 first and operates with a 50% duty cycle when returning from skip mode, which results in imbalanced resonant tank current, causes SMPS 100 to generate acoustic noise, and increases power losses due to hard switching.

SUMMARY

A need exists for increasing efficiency of a resonant mode converter at light loads while limiting acoustic noise. Accordingly, in one embodiment, the present disclosure is a method of generating a voltage signal comprising the step of providing a power conversion circuit including a high-side MOSFET and a low-side MOSFET. A conduction terminal of the high-side MOSFET is coupled to a conduction terminal of the low-side MOSFET at a half-bridge (HB) circuit node. The method further includes the steps of switching off the high-side MOSFET, counting voltage potential transitions of the HB circuit node while the high-side MOSFET and low-side MOSFET are off, and postponing assertion of a control signal to the low-side MOSFET for two voltage potential transitions of the HB circuit node after switching off the high-side MOSFET.

In another embodiment, the present disclosure is a method of determining a power level of a power conversion circuit comprising the steps of providing a power conversion circuit including a first switch coupled to a second switch at a HB circuit node, detecting voltage potential transitions of the HB circuit node, and counting peaks or valleys of the HB circuit node based on the voltage potential transitions while the first switch and second switch remain off.

In another embodiment, the present disclosure is a power conversion circuit comprising a first switch including a conduction terminal and a control terminal. A second switch includes a conduction terminal of the second switch coupled to the conduction terminal of the first switch. A dV/dt sensor is coupled to the conduction terminal of the first switch. A valley/peak detection and lockout block includes an input coupled to an output of the dV/dt sensor and an output of the valley/peak detection and lockout block configured to delay assertion of a control signal to the control terminal of the first switch.

BRIEF DESCRIPTION OF THE DRAWINGS

FIGS. 2a-2f illustrate operation of a resonant mode LLC power converter;

DETAILED DESCRIPTION OF THE DRAWINGS

The following describes one or more embodiments with reference to the figures, in which like numerals represent the same or similar elements. While the figures are described in terms of the best mode for achieving certain objectives, the description is intended to cover alternatives, modifications, and equivalents as may be included within the spirit and scope of the disclosure.

Figure 3:
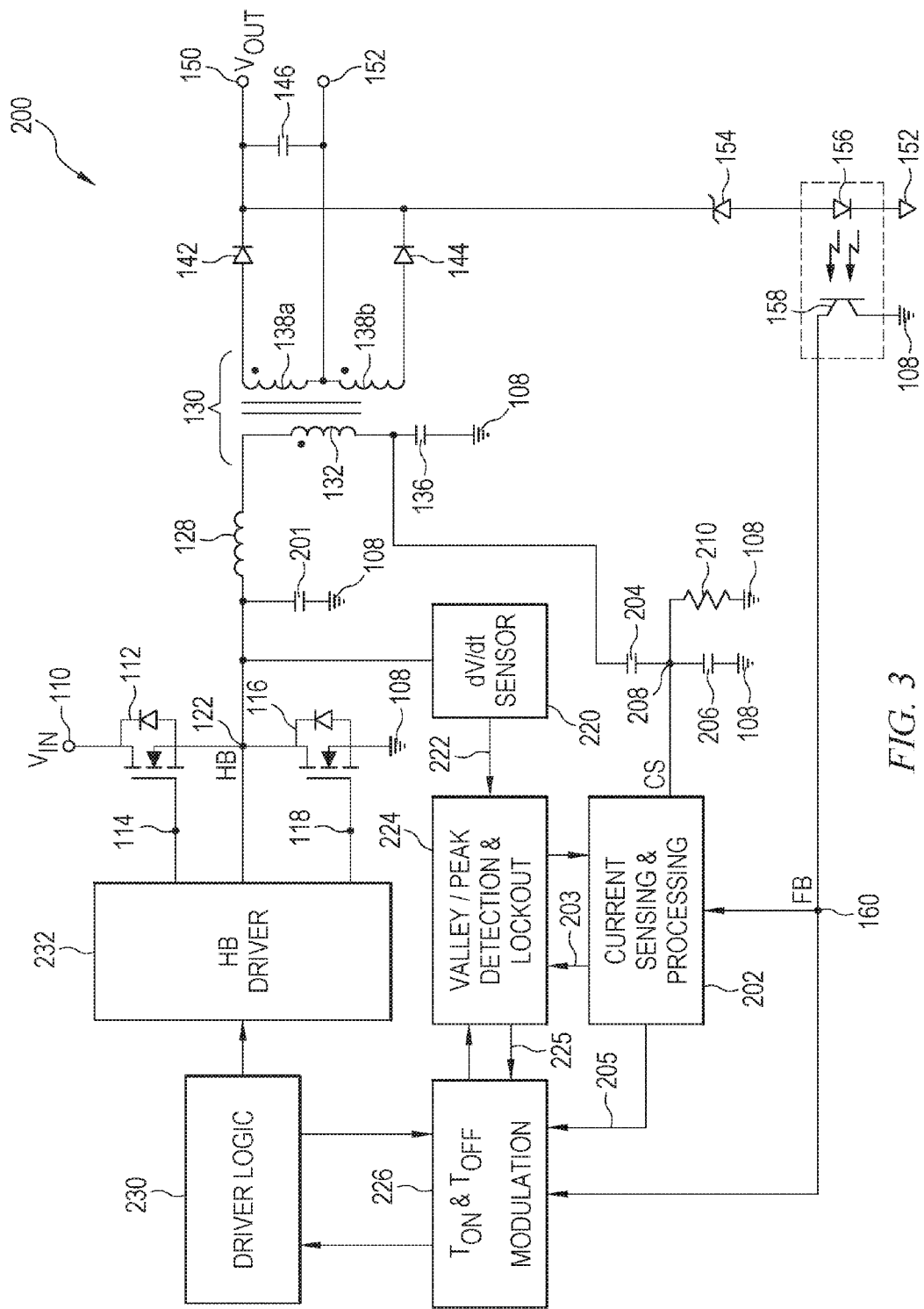
FIG. 3 illustrates a circuit and block diagram of an LLC resonant mode converter that includes a quasi-resonant (QR) mode to increase efficiency at light loads.

FIG. 3 illustrates a switch-mode power supply (SMPS) 200. SMPS 200 is similar to SMPS 100, except that the controller of SMPS 200 implements a hybrid control technique for switching MOSFETs 112 and 116 under light load conditions. Rather than entering skip mode, and ceasing switching of MOSFETs 112 and 116 entirely, SMPS 200 enters a quasi-resonant (QR) mode that delays turning on MOSFETs 112 and 116 to lower the switching frequency while still periodically turning on MOSFETs 112 and 116 in an alternating fashion to maintain balanced operation. The controller of SMPS 200 aligns switching of MOSFETs 112 and 116 with peaks and valleys during resonant oscillations of the voltage potential at HB node 122 in order to maintain zero voltage switching (ZVS), reduce acoustic noise generation by SMPS 200, and improve light load efficiency.

Figure 1:
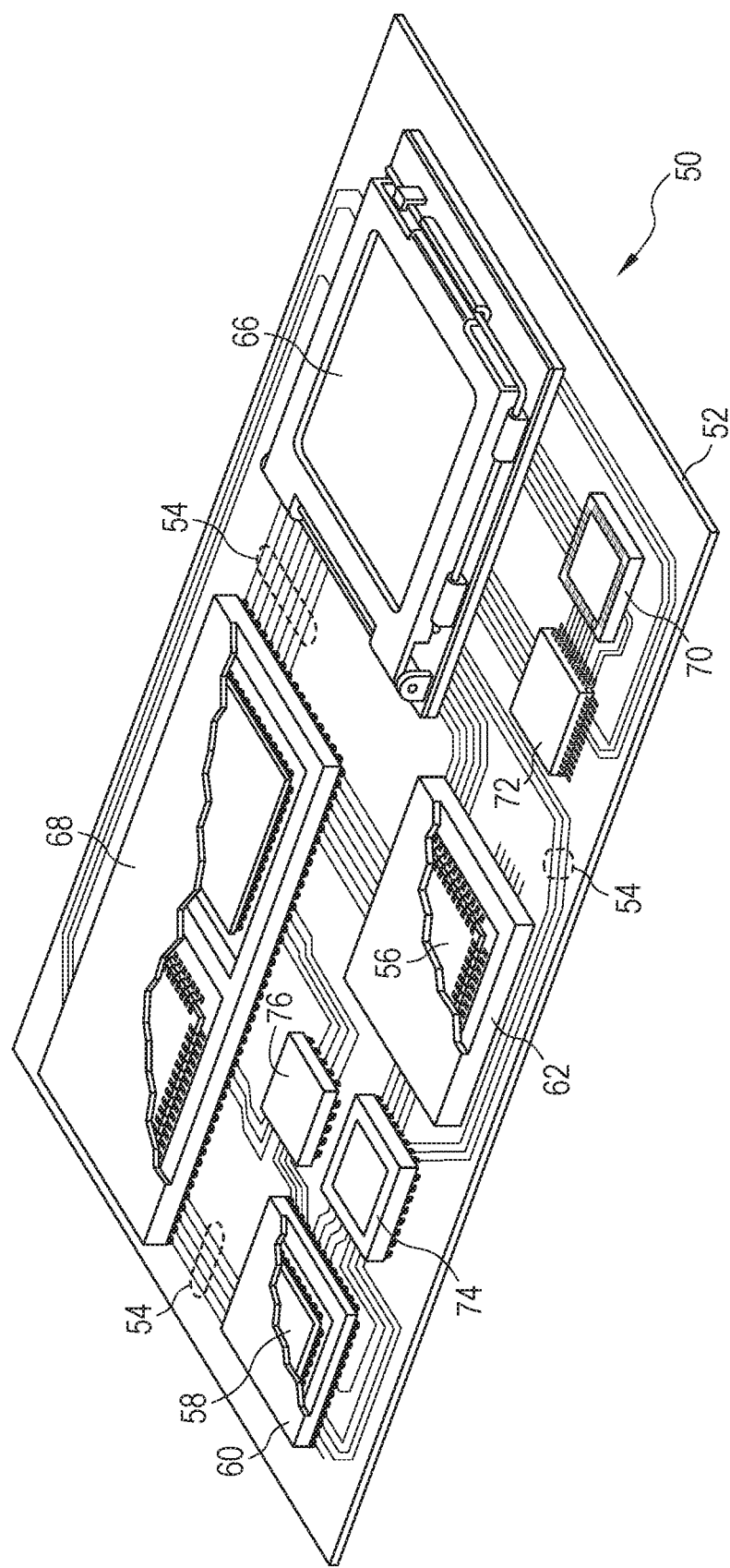
FIG. 1 illustrates an exemplary electronic device that uses an LLC resonant mode converter.
Figure 2A:
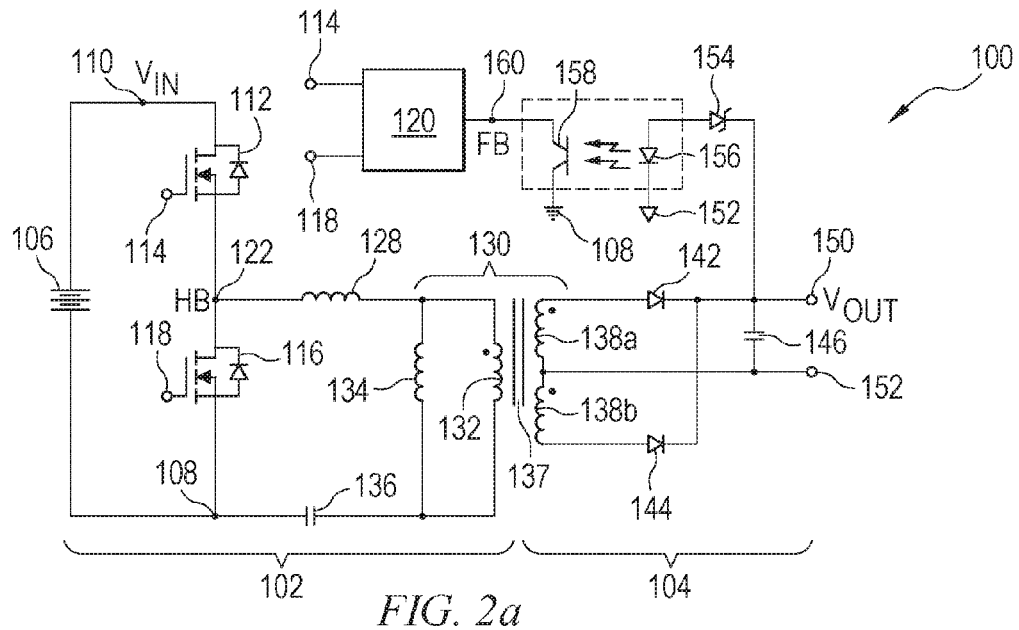
Figure 2B:
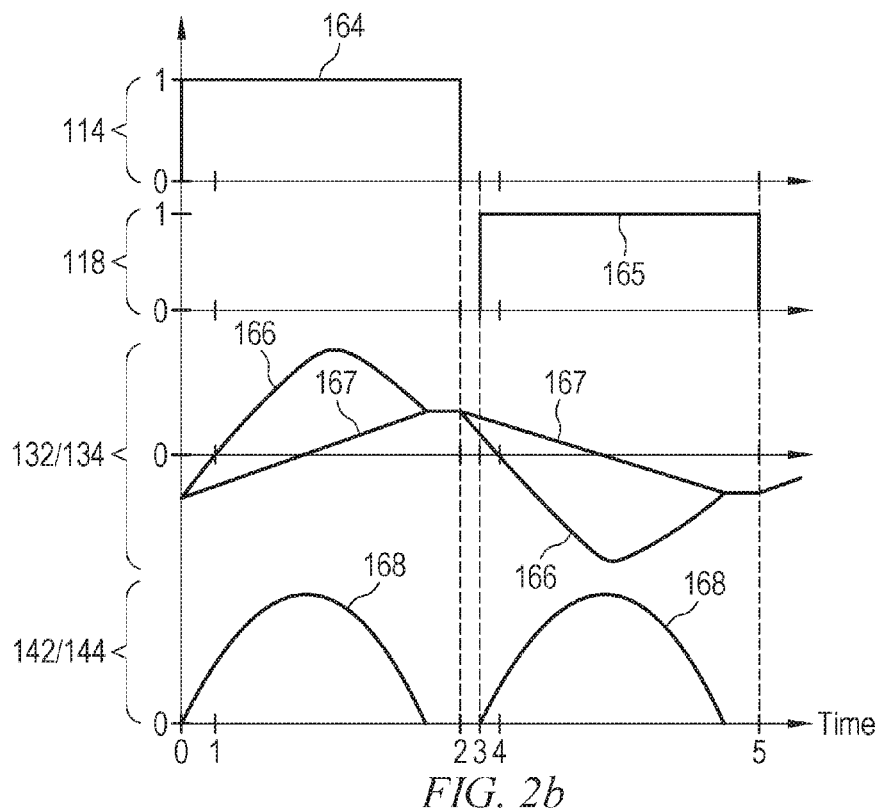
Figure 2C:
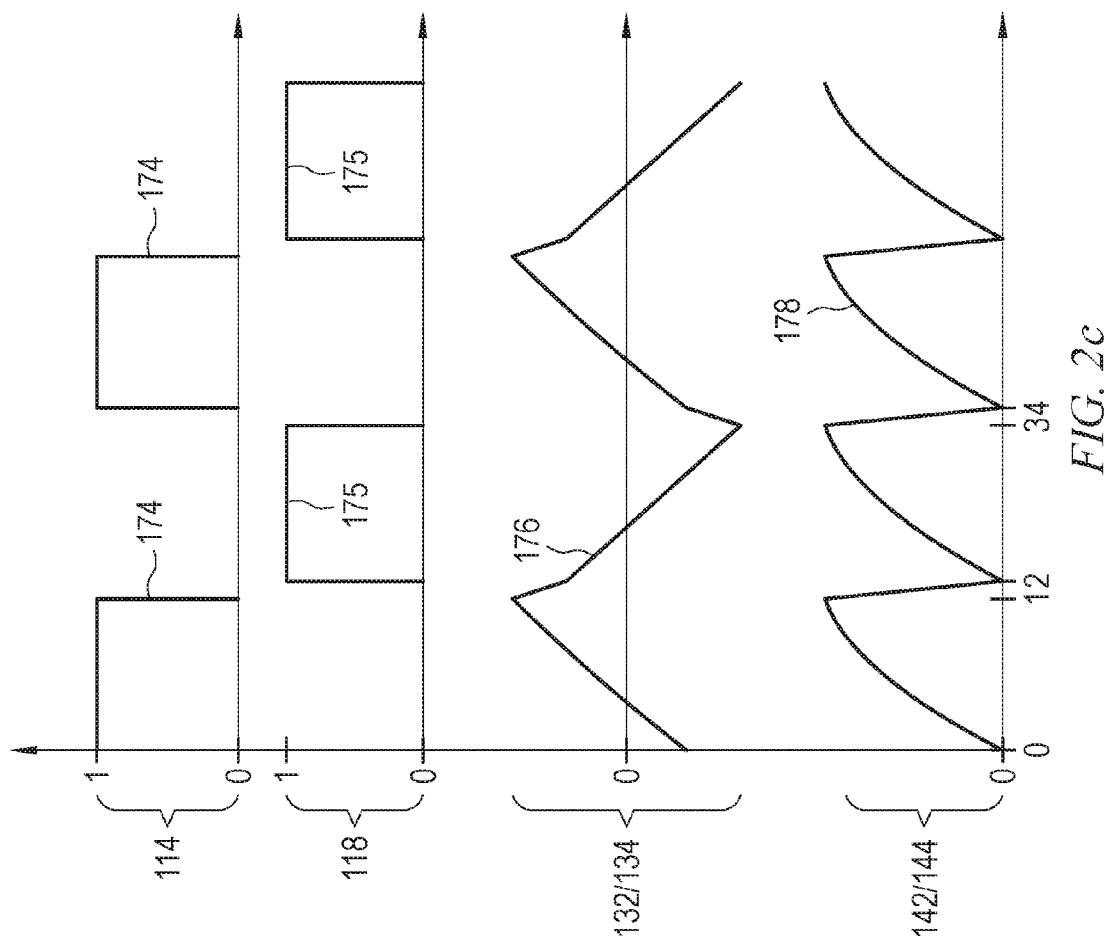
Figure 2E:
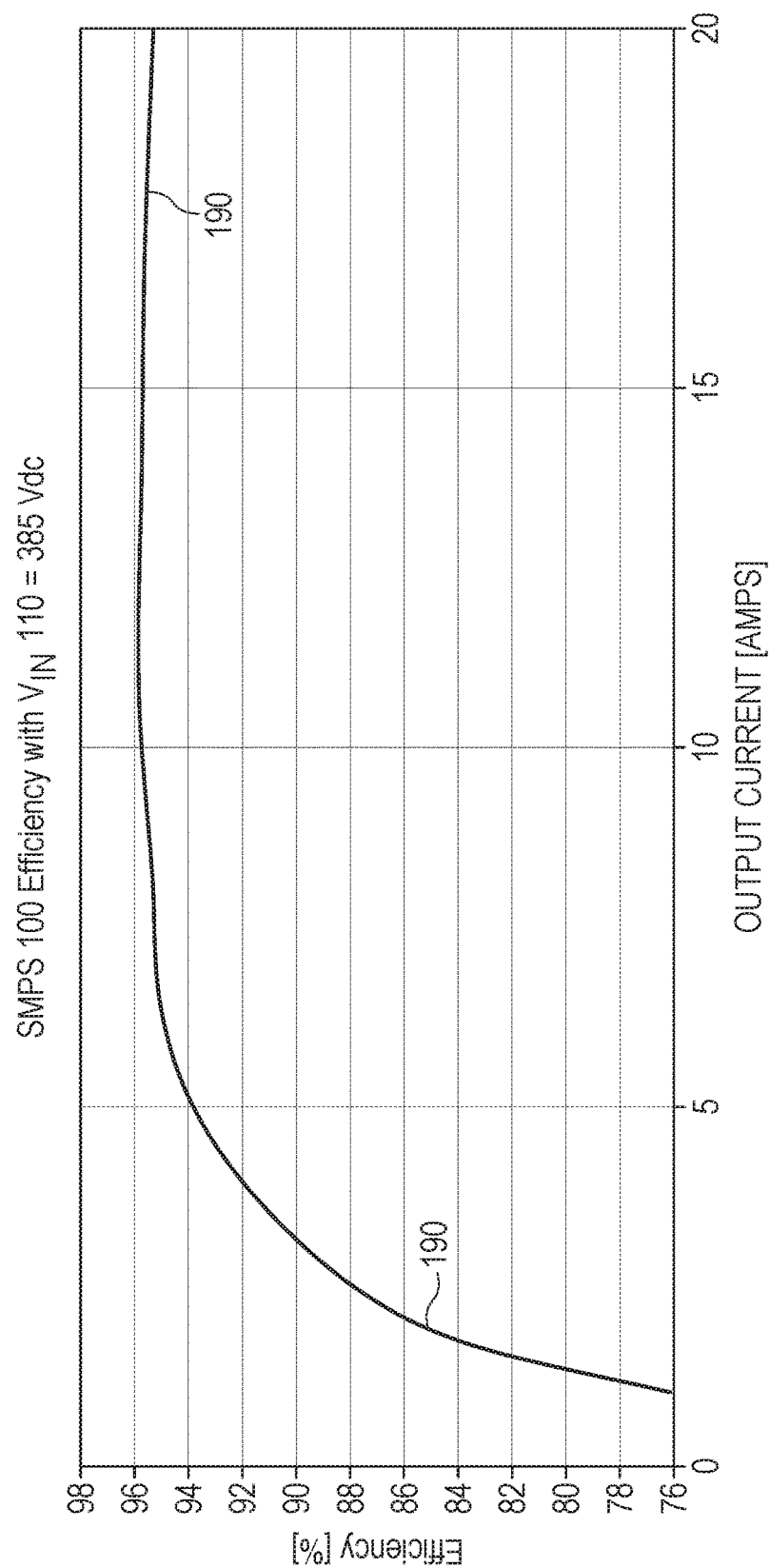
Figure 2F:
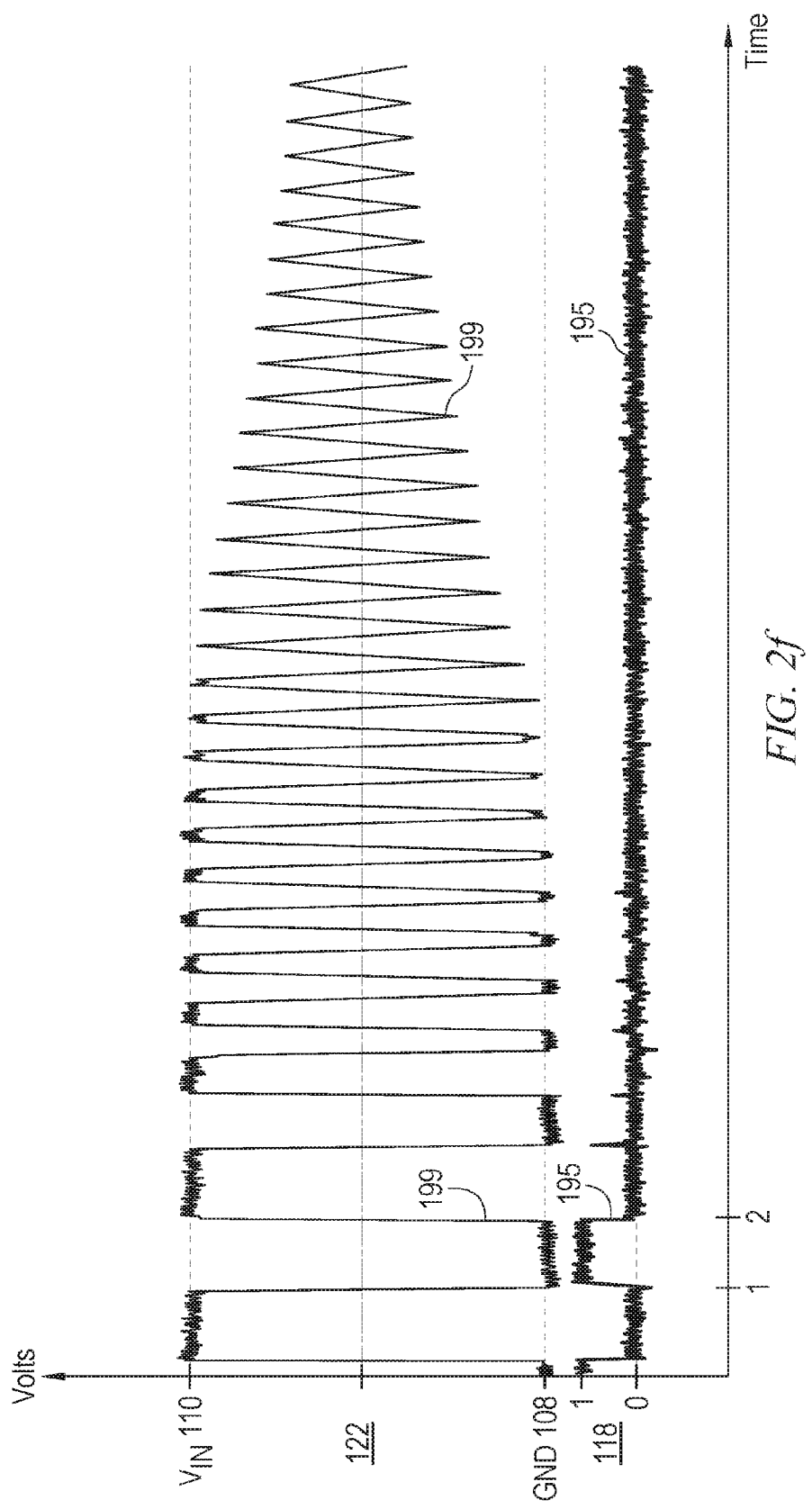

As seen in FIG. 2f, after a pulse of control signal 118 to low-side MOSFET 116, HB node 122 resonates periodically even without additional input from MOSFET 112 or 116 turning on. Under normal frequency modulation operation, SMPS 100 always switches high-side MOSFET 112 on when the voltage potential of HB node 122 first reaches a peak, just after time 2 in FIG. 2f, by resonance between resonant inductor 128, primary winding 132, resonant capacitor 136, and other parasitic inductances and capacitances. HB node 122 and $V_{IN}$ node 110 are at approximately the same voltage potential, and there is nearly zero voltage drop across high-side MOSFET 112 when high-side MOSFET 112 is turned on.

In QR mode, SMPS 200 skips turning on high-side MOSFET 112 just after time 2. HB node 122 continues oscillating with the resonance of resonant inductor 128, primary winding 132, and resonant capacitor 136. SMPS 200 delays turning on high-side MOSFET 112 until a subsequent peak of HB node 122 is detected. The next pulse of control signal 114 to low-side MOSFET 116 is delayed by valley/peak detection and lockout block 224 until the second peak, third peak, or any other subsequent peak of the voltage potential at HB node 122. The number of peaks to delay for after each pulse of control signal 118 before turning on high-side MOSFET 112 is modified as needed to adjust the amount of power transferred from primary side 102 to secondary side 104. As long as high-side MOSFET 112 is turned on while the voltage potential of HB node 122 is near the voltage potential of $V_{IN}$ node 110, ZVS is achieved. The oscillations of HB node 122 are diminished over time so that the voltage peaks no longer reach $V_{IN}$ node 110. High-side MOSFET 112 is turned on during the peaks of HB node 122 to reduce switching losses even if ZVS is not achievable.

After eventually pulsing control signal 114 to turn on high-side MOSFET 112 during a peak of the voltage potential at HB node 122, SMPS 200 waits a similar number of valleys before turning on low-side MOSFET 116 again. A valley is the time when the voltage potential of HB node 122 is near the voltage potential of ground node 108, or at least near a local minimum. While HB node 122 is near the voltage potential of ground node 108, low-side MOSFET 116 is turned on with ZVS. If HB node 122 diminishes such that the voltage potential of HB node 122 does not reach the voltage potential of ground node 108, low-side MOSFET 116 is still turned on in the valleys of HB node 122 to reduce power losses and hard switching of MOSFET 116.

SMPS 200 continues alternating between pulsing control signal 114 to turn on high-side MOSFET 112, and pulsing control signal 118 to turn on low-side MOSFET 116, while delaying a number of valleys or a number of peaks between each pulse. Valley/peak detection and lockout block 224 increases the number of valleys or peaks to wait between each pulse as the load on SMPS 200 is further reduced. Valley/peak detection and lockout block 224 decreases the number of valleys or peaks skipped between each pulse as the load on SMPS 200 increases.

FIG. 3 illustrates portions of the controller of SMPS 200 as current sensing and processing block 202, dV/dt sensor 220, valley/peak detection and lockout block 224, $T_{ON}$ and $T_{OFF}$ modulation block 226, driver logic 230, and HB driver 232. While certain functionality of SMPS 200 is described as being performed by specific blocks, the described functionality may be split among functional blocks differently in other embodiments. Capacitor 201 represents the parasitic capacitances of MOSFETs 112 and 116 for purposes of analysis. Capacitors 204 and 206 form a voltage divider between primary winding 132 and ground node 108 with current sense (CS) node 208 between capacitors 204 and 206 coupled to current sensing and processing block 202. Resistor 210 is coupled between CS node 208 and ground node 108 in parallel with capacitor 206.

Current sensing and processing block 202 senses the resonant current through primary winding 132 by observing the voltage potential of CS node 208. Current sensing and processing block 202 is also coupled to FB node 160 to observe the voltage potential of $V_{OUT}$ node 150. Current sensing and processing block 202 provides a metric signal 203 to valley/peak detection and lockout block 224. Valley/peak detection and lockout block 224 compares metric signal 203 against thresholds to determine when to enter or exit QR mode, and how many peaks or valleys to skip when in QR mode. Metric signal 203 can be based solely on FB node 160, CS node 208, another desired metric, or a combination thereof. Current sensing and processing block 202 also generates a turn-off signal 205 that tells $T_{ON}$ and $T_{OFF}$ modulation block 226 to switch off whichever MOSFET 112 or 116 is turned on based on a comparison between FB node 160 and CS node 208.

The dV/dt sensor 220 includes an input coupled to HB node 122 and outputs dV/dt signal 222 to valley/peak detection and lockout block 224. Valley/peak detection and lockout block 224 receives dV/dt signal 222 to determine when peaks and valleys of voltage potential at HB node 122 occur. In one embodiment, dV/dt signal 222 comprises two separate one-bit outputs, negative dV/dt signal 222a and positive dV/dt signal 222b. The dV/dt sensor 220 outputs a logic one value on negative dV/dt signal 222a when a magnitude of −dV/dt on HB node 122 is greater than a threshold. Otherwise, negative dV/dt signal 222a is output as a logic zero value, i.e., while the voltage potential at HB node 122 is rising or not changing significantly. Similarly, dV/dt sensor 220 outputs a logic one value on positive dV/dt signal 222b when a magnitude of dV/dt on HB node 122 is greater than a threshold. Otherwise, dV/dt sensor 220 outputs a logic zero value at positive dV/dt signal 222b, i.e., when the voltage potential of HB node 122 is falling or not changing significantly. Other signaling schemes for detecting and communicating valleys and peaks of HB node 122 are used in other embodiments.

Figure 4A:
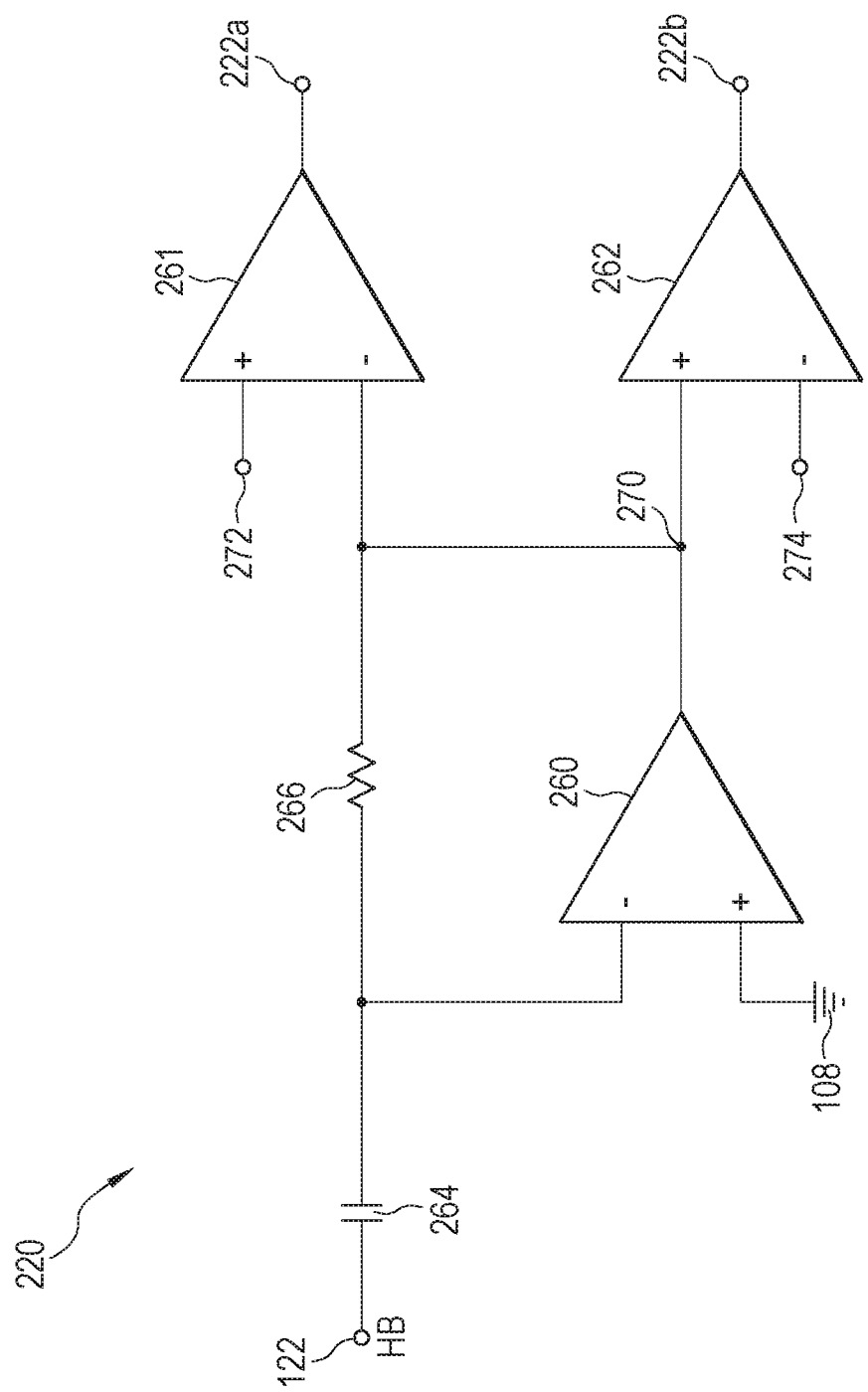
FIGS. 4a-4b illustrate a dV/dt sensor.

FIG. 4a illustrates one embodiment of dV/dt sensor 220. The dV/dt sensor 220 includes HB node 122 as an input, and outputs dV/dt signals 222a and 222b. Op-amp 260 is configured as a differentiator by capacitor 264 and resistor 266. The output of op-amp 260 at circuit node 270 is a voltage potential approximately proportional to dV/dt of HB node 122 due to the configuration of op-amp 260 as a differentiator. Op-amp 261 is configured to compare the dV/dt of HB node 122, represented by the voltage potential at circuit node 270, against a negative dV/dt threshold voltage 272. If the voltage potential at circuit node 270 is below negative dV/dt threshold voltage 272, then negative dV/dt signal 222a is asserted by op-amp 261. Op-amp 262 compares the voltage potential at circuit node 270 against positive dV/dt threshold voltage 274 and asserts positive dV/dt signal 222b if the positive dV/dt of HB node 122 exceeds the threshold. In one embodiment, op-amp 260 and resistor 266 are not used, and capacitor 264 is directly coupled to inputs of op-amps 261 and 262.

Figure 4B:
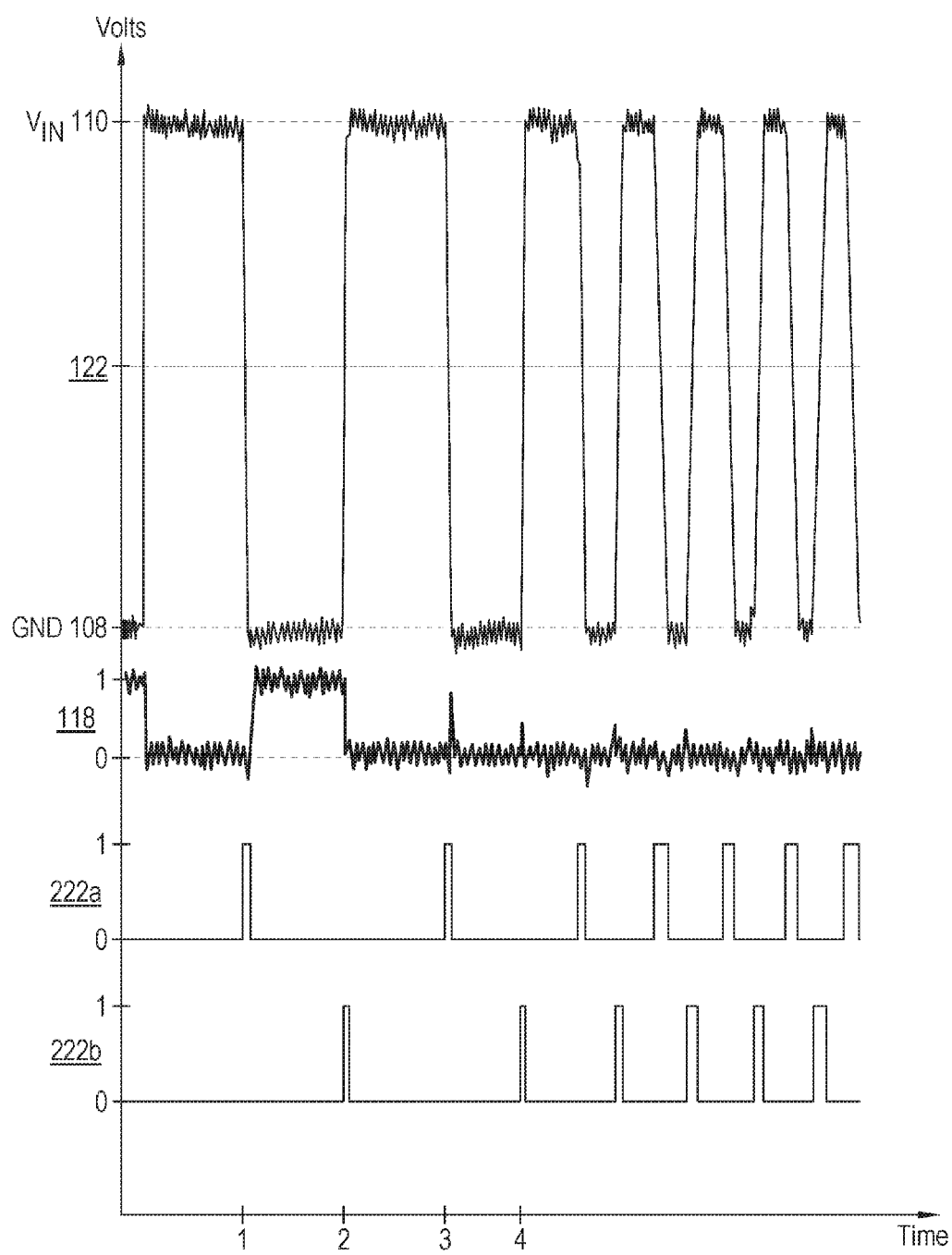

FIG. 4b illustrates operation of dV/dt sensor 220. The voltage potential at HB node 122 drops relatively rapidly near time 1 once high-side MOSFET 112 is turned off. The falling voltage potential at HB node 122 causes the voltage potential at circuit node 270 to be reduced below threshold voltage 272, and negative dV/dt signal 222a is asserted while HB node 122 falls near time 1. Between time 1 and time 2, the voltage potential of HB node 122 is relatively steady, and neither of dV/dt signals 222a and 222b are asserted. Low-side MOSFET 116 is switched off at time 2, and driver logic 230 ceases switching of MOSFETs 112 and 116 as in FIG. 2f. However, primary side 102 continues to resonate after low-side MOSFET 116 is switched off at time 2, and HB node 122 oscillates between the voltage potentials of $V_{IN}$ node 110 and ground node 108 while also diminishing over time.

Around time 2 in FIG. 4b, while the LLC tank of SMPS 200 begins to resonate, the voltage potential of HB node 122 rises from the voltage potential of ground node 108 to the voltage potential of $V_{IN}$ node 110. The voltage potential rise over time, or dV/dt, of HB node 122 causes the voltage potential at circuit node 270 to exceed the threshold voltage 272 in dV/dt sensor 220, and positive dV/dt signal 222b is asserted. HB node 122 continues to oscillate between ground node 108 and $V_{IN}$ node 110 while diminishing after time 2. The dV/dt signals 222 continue pulsing at the transitions of HB node 122.

Valley/peak detection and lockout block 224 receives dV/dt signals 222, which indicate when peaks and valleys of the voltage potential at HB node 122 occur. A voltage peak of HB node 122 is reached when the voltage potential of HB node 122 substantially stops rising. A voltage potential peak occurs when HB node 122 is at approximately the highest voltage potential value of HB node 122, at least for a particular resonant cycle. A valley of HB node 122 is a negative peak, i.e., reached when the voltage potential of HB node 122 substantially stops falling. A valley of HB node 122 means that approximately the lowest voltage potential value for a particular resonant cycle is reached.

A positive, or logic one, value of negative dV/dt signal 222a indicates that the voltage potential of HB node 122 is actively falling. A positive value of positive dV/dt signal 222b indicates that the voltage potential of HB node 122 is actively increasing. Negative transitions, i.e., a transition from a logic one value to a logic zero value, of negative dV/dt signal 222a indicate that a period of negative voltage change on HB node 122 has ended, and thus a valley has been reached. The voltage potential of HB node 122 remains substantially within a valley, i.e., near a local minimum, until the voltage potential at HB node 122 begins to rise again and positive dV/dt signal 222b is asserted by dV/dt sensor 220. Valley/peak detection and lockout block 224 understands the voltage potential of HB node 122 to be in a valley between a pulse of negative dV/dt signal 222a and a pulse of positive dV/dt signal 222b.

Negative transitions of positive dV/dt signal 222b indicate that a period of positive voltage change on HB node 122 has ended and a peak has been reached. The voltage potential of HB node 122 remains substantially within a peak, i.e., near a local maximum, until the voltage potential at HB node 122 begins to fall again and negative dV/dt signal 222a is asserted by dV/dt sensor 220. Valley/peak detection and lockout block 224 understands the voltage potential of HB node 122 to be in a peak between a pulse of positive dV/dt signal 222b and a pulse of negative dV/dt signal 222a.

Returning to FIG. 3, valley/peak detection and lockout block 224 receives information pertaining to output voltage potential at $V_{OUT}$ node 150, the electric current through primary winding 132, or another metric as metric signal 203. Valley/peak detection and lockout block 224 uses metric signal 203 to detect the load on SMPS 200 coupled to $V_{OUT}$ node 150, and then determines when conditions indicate QR mode should be entered and how many valleys and peaks should be skipped before each pulse of control signals 114 and 118. QR mode is entered based on output power of SMPS 200, output current, resonant current, or another appropriate metric in various embodiments.

As the load on SMPS 200 decreases, metric signal 203 from current sensing and processing block 202 shifts in recognition that less power is required to be transferred from primary side 102 to secondary side 104. Valley/peak detection begins inserting breaks between pulses of control signals 114 and 118 when metric signal 203 moves across a QR mode turn-on threshold. In other embodiments, primary current sensing and processing block 202 determines when QR mode should be entered, and communicates a number of valleys/peak to skip using signal 203.

$T_{ON}$ and $T_{OFF}$ modulation block 226 is responsible for timing of transitions of control signals 114 and 118. When a MOSFET 112 or 116 is turned on, $T_{ON}$ and $T_{OFF}$ modulation block 226 receives turn-off signal 205 from a comparator in current sensing and processing block that compares CS node 208 against FB node 160. $T_{ON}$ and $T_{OFF}$ modulation block 226 switches off control signal 114 or 118 once the CS node 208 voltage potential crosses the FB node 160 voltage potential. In some embodiments, current sensing and processing block 202 shifts or divides the voltage potentials of FB node 160 or CS node 208 prior to the comparison to generate turn-off signal 205.

After switching off a control signal 114 or 118 under normal operation, $T_{ON}$ and $T_{OFF}$ modulation block 226 waits a dead-time period to allow resonance to carry HB node 122 from ground potential to line voltage potential, or vice versa, and then turns on the opposite control signal 114 or 118. However, when current sensing and processing block 202 and valley/peak detection and lockout block 224 have turned on QR mode, a delay signal 225 from valley/peak detection and lockout block 224 to $T_{ON}$ and $T_{OFF}$ modulation block 226 causes the $T_{ON}$ and $T_{OFF}$ modulation block to insert additional delay in turning on the opposite control signal. In some embodiments, delay signal 225 is a one-bit digital signal. In other embodiments, separate signals are used for delaying control signal 114 and delaying control signal 118.

Valley/peak detection and lockout block 224 asserts delay signal 225 to $T_{ON}$ and $T_{OFF}$ modulation block 226 when QR mode is entered. Delay signal 225 stops $T_{ON}$ and $T_{OFF}$ modulation block 226 from immediately turning on a MOSFET 112 or 116. Valley/peak detection and lockout block 224 counts peaks or valleys of HB node 122 based on pulses of dV/dt signal 222 until a desired number of valleys or peaks have been skipped. The number of peaks or valleys to skip is indicated by comparing metric signal 203 against a plurality of thresholds within valley/peak detection and lockout block 224. Once the number of valleys or peaks have passed, valley/peak detection and lockout block 224 de-asserts delay signal 225 and $T_{ON}$ and $T_{OFF}$ modulation block 226 directs driver logic block 230 to assert the next control signal 114 or 118. $T_{ON}$ and $T_{OFF}$ modulation block 226 acknowledges that the next MOSFET 112 or 116 was turned on using a return signal to valley/peak detection and lockout block 224. Valley/peak detection and lockout block 224 asserts delay signal 225 again, and begins counting peaks or valleys for the next delay.

Driver logic 230 creates the control signals to gates 114 and 118 based on signals received from $T_{ON}$ and $T_{OFF}$ modulation block 226, and outputs the control signals to HB driver block 232. HB driver block 232 is an amplifier that provides the output current necessary to switch MOSFETs 112 and 116.

By entering quasi-resonant mode, SMPS 200 omits some switching periods to reduce the effective operating frequency. Magnetizing current is reduced, which increases overall efficiency due to magnetizing current contributing less to power losses during light load operation. SMPS 200 still operates in continuous operation mode, even when QR mode is enabled, by regularly issuing pulses that alternatively turn on MOSFETs 112 and 116 under ZVS conditions. The continued switching of MOSFETs 112 and 116 with delayed turn-on times reduces acoustic noise of SMPS 200 relative to entering skip mode and temporarily stopping all switching of the MOSFETs. SMPS 200 omits switching pulses in a controlled manner during QR mode rather than stopping all switching as in skip mode.

In QR mode, SMPS 200 detects parasitic ringing peaks and valleys and activates the opposite switch in those time periods, when power losses are reduced. Similar delays are utilized prior to turning on high-side MOSFET 112 and low-side MOSFET 116 so that SMPS 200 operates symmetrically. More parasitic oscillation periods are omitted when load is reduced further. In some embodiments, skip mode is entered, or SMPS 200 is switched completely off, when the load is reduced sufficiently or completely disconnected.

Figure 5A:
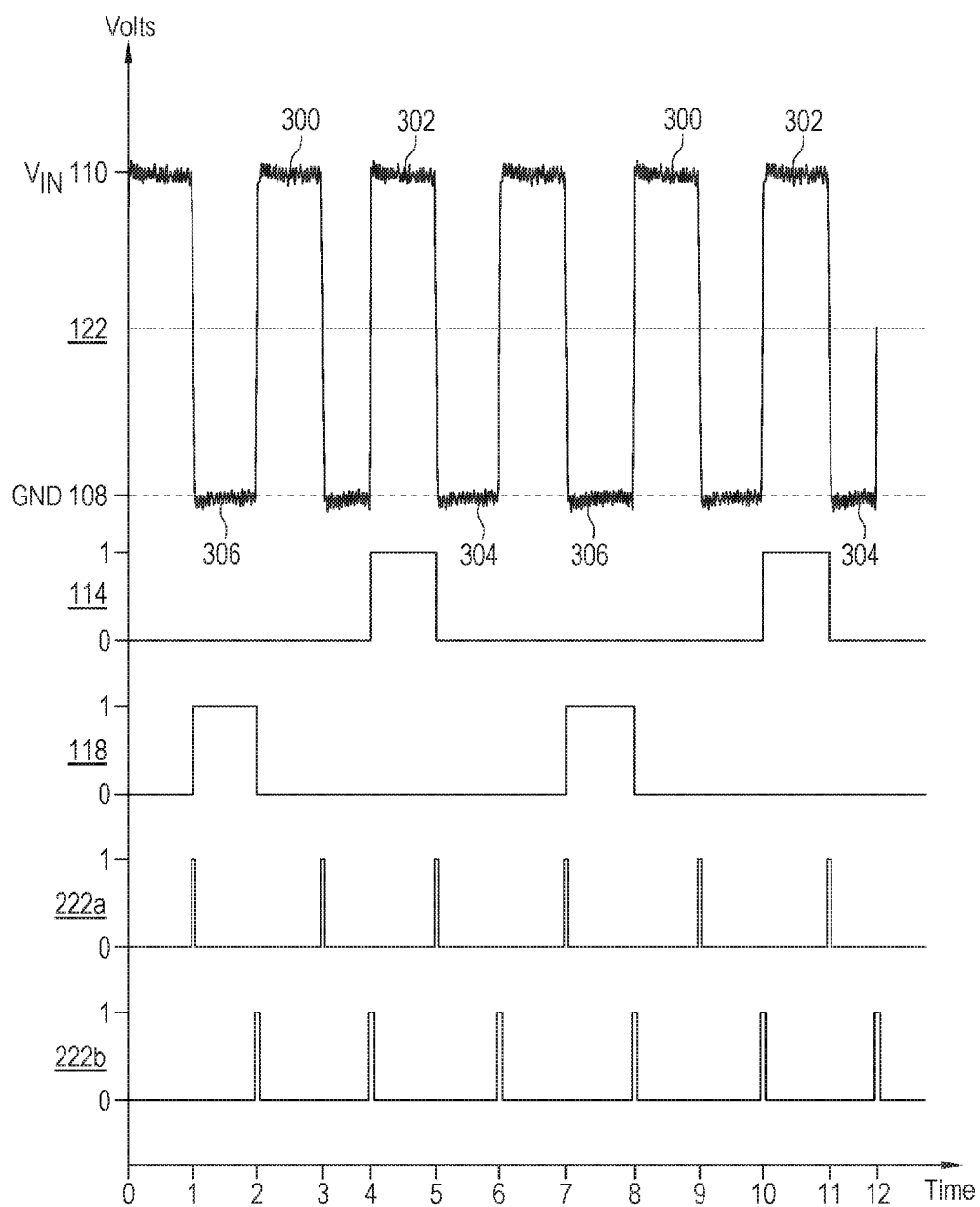
FIGS. 5a-5c illustrate an LLC resonant mode converter operating in QR mode.
Figure 5B:
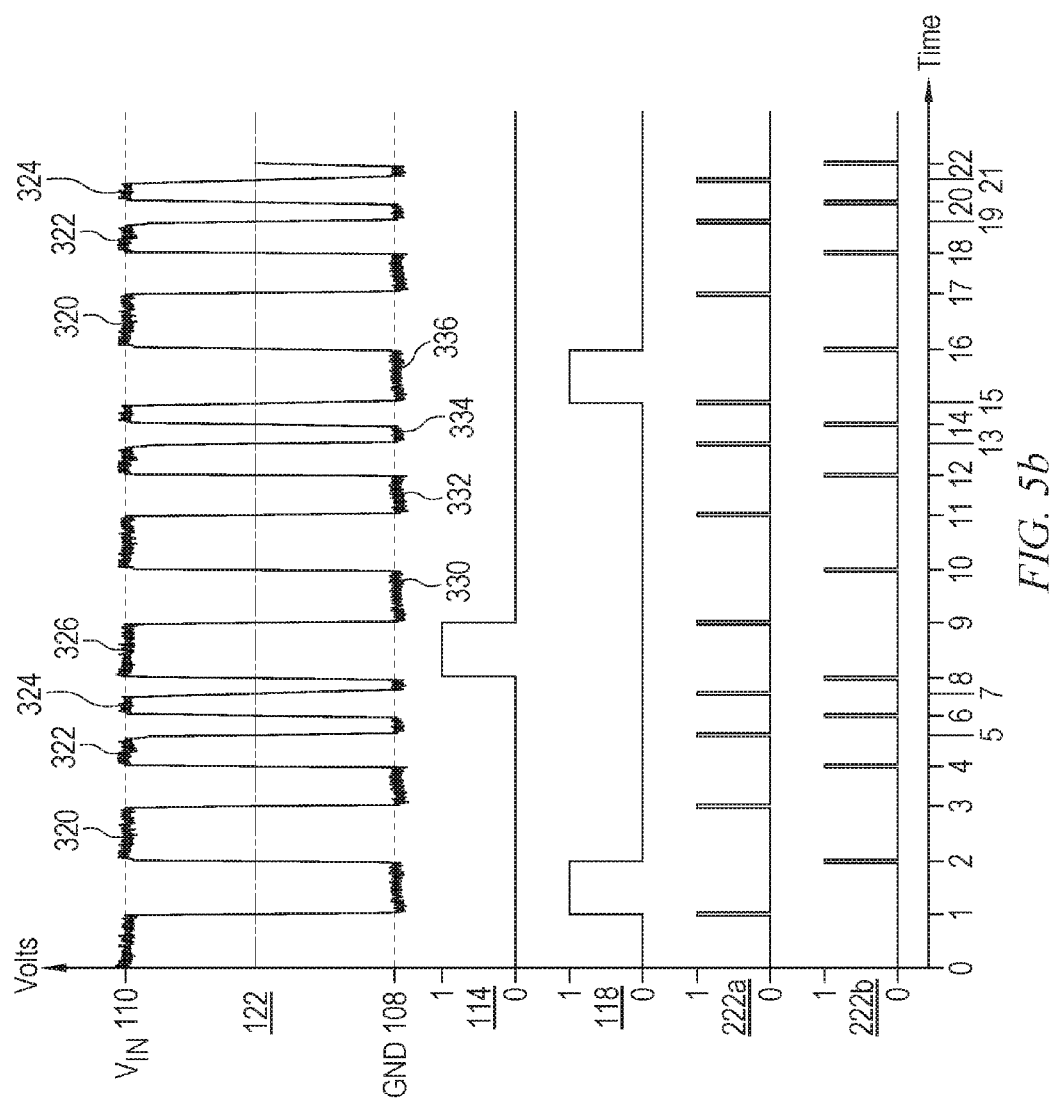
Figure 5C:
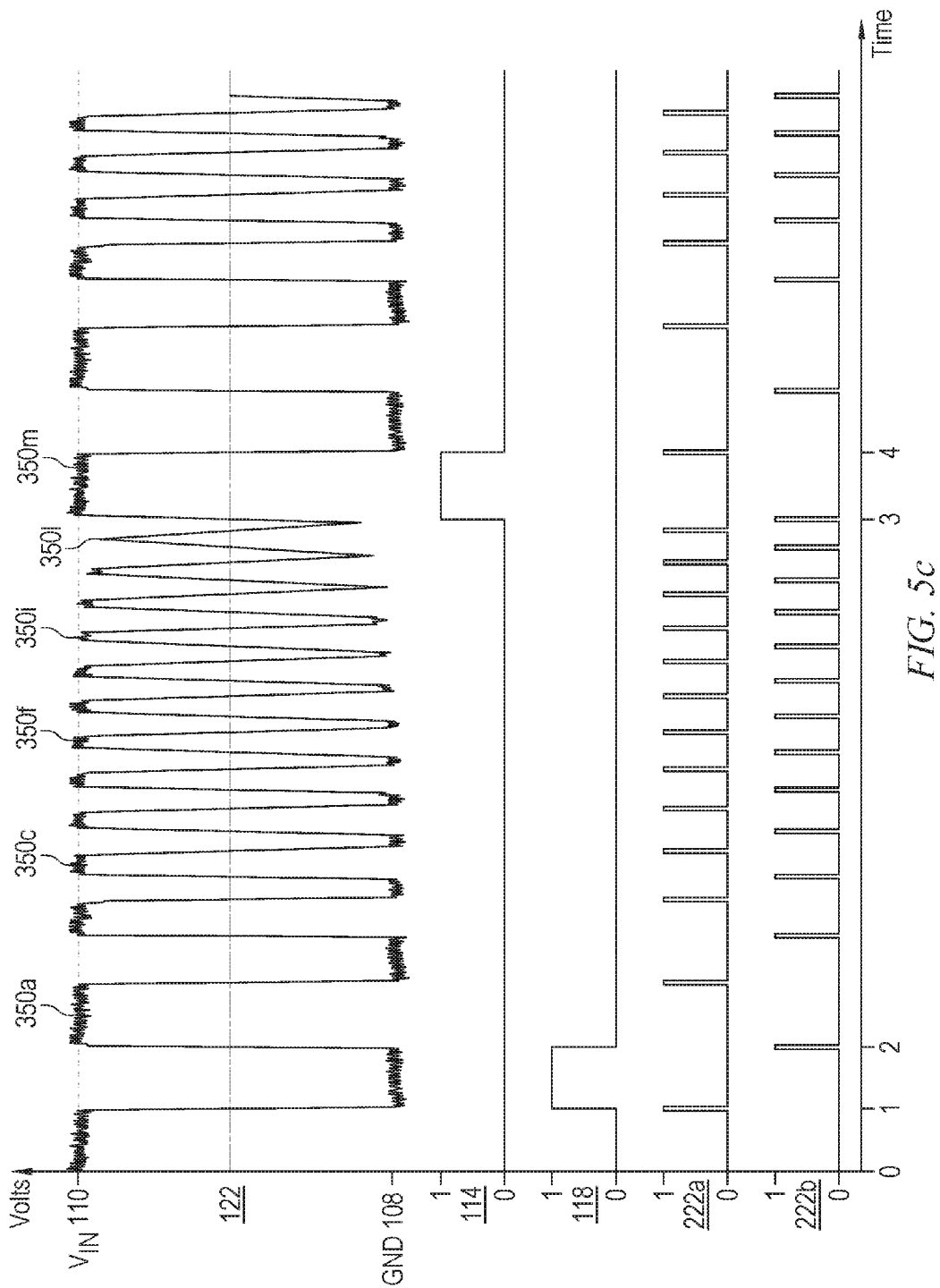

FIGS. 5a-5c illustrate SMPS 200 operating in QR mode. The X, or horizontal, axes in FIGS. 5a-5c illustrate the passage of time. The X-axes are labelled to show approximate times when HB node 122 transitions, rather than in units of time. The Y, or vertical, axes in FIGS. 5a-5c illustrate voltage potentials or logical values. In FIG. 5a, the load of SMPS 200 has fallen below a first threshold for valley/peak detection and lockout block 224 determining that one valley and one peak should be skipped each power cycle. Low-side MOSFET 116 is turned on by control signal 118 between time 1 and time 2 in FIG. 5a. HB node 122 is coupled to ground node 108 by low-side MOSFET 116 between time 1 and time 2, and is held at approximately ground potential. The voltage potential of HB node 122 falling to ground potential around time 1 causes negative dV/dt signal 222a to be briefly asserted at approximately time 1, indicating a negative dV/dt on HB node 122.

At time 2 in FIG. 5a, after control signal 118 is de-asserted, energy in the resonant tank of SMPS 200 transitions HB node 122 to near the voltage potential of $V_{IN}$ node 110. Under normal frequency modulation operation, $T_{ON}$ and $T_{OFF}$ modulation block 226 would cause driver logic 230 to assert control signal 114 and turn on high-side MOSFET 112 once the voltage potential of HB node 122 reaches approximately the voltage potential of $V_{IN}$ node 110. However, SMPS 200 is in QR mode, and valley/peak detection and lockout block 224 asserts delay signal 225 to $T_{ON}$ and $T_{OFF}$ modulation block 226 to skip turning on high-side MOSFET 112 during peak 300 of HB node 122.

The positive transition of HB node 122 around time 2 in FIG. 5a is detected by dV/dt sensor 220 and a pulse of positive dV/dt signal 222b is observed at approximately time 2. The pulse of positive dV/dt signal 222b results in a counter in valley/peak detection and lockout block 224 being incremented or decremented. The voltage potential of HB node 122 returns to approximately ground potential at time 3, but low-side MOSFET 116 is not turned on. Low-side MOSFET 116 was the most recent MOSFET turned on, so SMPS 200 is waiting for a peak of HB node 122 to turn on high-side MOSFET 112 to maintain balanced operation.

At approximately time 4, resonance returns the voltage potential at HB node 122 to approximately the voltage potential of $V_{IN}$ node 110. HB node 122 remains in peak 302 between time 4 and time 5. The pulse of positive dV/dt signal 222b around time 4 causes valley/peak detection and lockout block 224 to de-assert delay signal 225 to $T_{ON}$ and $T_{OFF}$ modulation block 226 since the counter in valley/peak detection and lockout block 224 has been incremented or decremented to the desired threshold to skip one peak. De-asserting delay signal 225 by valley/peak detection and lockout block 224 signals $T_{ON}$ and $T_{OFF}$ modulation block 226 to start the next pulse of control signal 114 to turn on high-side MOSFET 112 at time 4.

After high-side MOSFET 112 is turned off at time 5 in FIG. 5a, the voltage potential at HB node 122 returns to approximately ground potential and stays in valley 304 between time 5 and 6. A counter in valley/peak detection and lockout block 224 is incremented or decremented to indicate that a valley was skipped and the next valley should produce a pulse of control signal 118. HB node 122 rises to approximately the voltage potential of $V_{IN}$ node 110 at time 6, and returns low to be in valley 306 between time 7 and time 8. Since valley 304 was skipped, and the current power output of SMPS 200 indicates that only one valley should be skipped each power cycle, the pulse of negative dV/dt signal 222a at time 7 causes valley/peak detection and lockout block 224 to de-assert delay signal 225 so that control signal 118 is asserted from time 7 to time 8 and valley 306 is not skipped.

The cycle restarts, with SMPS 200 skipping peak 300 from time 8 to time 9 in FIG. 5a, and asserting control signal 114 from time 10 to time 11 during peak 302. During QR mode when one peak and one valley is skipped per power cycle, SMPS 200 skips a peak 300 after each assertion of control signal 118. SMPS 200 asserts control signal 114 to turn on high-side MOSFET 112 during peak 302, which is the second peak of HB node 122 to occur after control signal 118 is de-asserted. To keep approximately symmetrical operation, SMPS 200 similarly skips a valley 304 after each assertion of control signal 114 to high-side MOSFET 112. SMPS 200 asserts control signal 118 to low-side MOSFET 116 during valley 306, which is the second valley to occur after each assertion of control signal 114.

SMPS 200 continues operating as shown in FIG. 5a, skipping one peak 300 and one valley 304 during each power cycle, until the load of SMPS 200 crosses a threshold. If the load of SMPS 200 increases over a threshold, QR mode will cease. SMPS 200 will assert control signal 114 to high-side MOSFET 112 during each peak of HB node 122, and will also assert control signal 118 to low-side MOSFET 116 during each valley of HB node 122. If the load of SMPS 200 is reduced below a threshold, the QR mode will be modified to skip additional peaks and additional valleys during each power cycle as illustrated in FIGS. 5b and 5c. In some embodiments, the QR mode transitions include a built-in hysteresis to reduce the likelihood that SMPS 200 rapidly moves back and forth between two states.

In FIG. 5b, the load on SMPS 200 has been reduced below a threshold indicating that three peaks and three valleys should be skipped each power cycle. Control signal 118 to low-side MOSFET 116 is asserted from time 1 to time 2 in FIG. 5b, similar to FIG. 5a. After control signal 118 is lowered at time 2, HB node 122 oscillates between the voltage potential of ground node 108 and the voltage potential of $V_{IN}$ node 110 as in FIG. 2f. Positive dV/dt signal 222b pulses at times 2, 4, 6, and 8 in FIG. 5b to indicate the beginning of peaks 320, 322, 324, and 326, respectively. The positive dV/dt signal 222b pulses at times 2, 4, and 6 increment the counter in valley/peak detection and lockout block 224. Just prior to time 8, the counter indicates that three pulses, 320, 322, and 324, have been skipped, so valley/peak detection and lockout block 224 de-asserts delay signal 225 when peak 326 is detected. Control signal 114 to high-side MOSFET 112 is asserted during peak 326 because delay signal 225 was de-asserted.

Control signal 114 to high-side MOSFET 112 is de-asserted at time 9, and HB node 122 again oscillates between the voltage potentials of ground node 108 and $V_{IN}$ node 110. Valley/peak detection and lockout block 224 counts and skips valleys 330, 332, and 334. At time 15 in FIG. 5b, the counter in valley/peak detection and lockout block 224 indicates that three valleys have been skipped, so the pulse of negative dV/dt signal 222a at time 15 causes the valley/peak detection and lockout block to de-assert delay signal 225 so that control signal 118 to low-side MOSFET 116 is asserted during valley 336 from time 15 to time 16.

SMPS 200 continues skipping three peaks 320, 322, and 324 after each pulse of control signal 118 to low-side MOSFET 116, and three valleys 330, 332, and 334 after each pulse of control signal 114 to high-side MOSFET 112, while the load of SMPS 200 stays within the thresholds for skipping three peaks and three valleys per power cycle. SMPS 200 remains approximately balanced and symmetrical because pulses of control signals 114 and 118 alternate and are approximately evenly spaced. QR mode allows SMPS 200 to reduce switching frequency, reducing magnetizing current through transformer 130, without increasing the power transfer from primary side 102 to secondary side 104.

FIG. 5c illustrates SMPS 200 with a load reduced beyond a threshold for skipping twelve peaks and twelve valleys each power cycle. SMPS 200 asserts control signal 118 to low-side MOSFET 116 from time 1 to time 2 in FIG. 5c. Low-side MOSFET 116 couples HB node 122 to ground node 108 from time 1 to time 2. HB node 122 oscillates with resonance after low-side MOSFET 116 is turned off at time 2, and valley/peak detection and lockout block 224 asserts delay signal 225. The dV/dt sensor 220 pulses positive dV/dt signal 222b to valley/peak detection and lockout block 224 at each rising edge of HB node 122. Valley/peak detection and lockout block 224 counts thirteen pulses of positive dV/dt signal 222b before de-asserting delay signal 225 to skip twelve peaks 350a-350l of HB node 122. In other embodiments, valley/peak detection and lockout block 224 counts twelve pulses of negative dV/dt signal 222a to skip twelve peaks 350a-350l.

On the rising edge of the thirteenth peak, 350m, of HB node 122, the counter in valley/peak lockout block 224 indicates the desired number of peaks has been skipped. Delay signal 225 is de-asserted by valley/peak detection and lockout block 224 to indicate that $T_{ON}$ & $T_{OFF}$ modulation block 226 should allow the next control signal 114 or 118 to be asserted. Since control signal 118 to lower MOSFET 116 was most recently asserted, from time 1 to time 2, driver logic 230 asserts control signal 114 to high-side MOSFET 112 at time 3 in FIG. 5c. Once control signal 114 is turned off at time 4, SMPS 200 skips twelve valleys of HB node 122 and turns control signal 118 to low-side MOSFET 116 back on. Alternating between turning on high-side MOSFET 112 and low-side MOSFET 116 maintains balanced operation of SMPS 200 even though the pulses are delayed to skip a certain number of valleys and peaks of HB node 122.

In FIG. 5c, the load on SMPS 200 is relatively low. Inserting a delay of twelve peaks and twelve valleys each power cycle results in MOSFETs 112 and 116 turning on when the voltage oscillations on HB node 122 have significantly diminished. The peaks of HB node 122 no longer reach the input voltage potential at $V_{IN}$ node 110, and the valleys no longer reach the voltage potential of ground node 108. ZVS is not achieved because the voltage potential of HB node 122 does not fully reach the input voltage or ground voltage. High-side MOSFET 112 is switched on near peaks of HB node 122, and low-side MOSFET 116 is switched on near valleys, so that switching losses attributed to turning on MOSFETs 112 and 116 are reduced even though ZVS may not be attained.

When the load of SMPS 200 is even further reduced, and QR mode skips a greater number of valleys and peaks each cycle, switching losses may be significantly increased as HB node 122 diminishes further before MOSFETs 112 and 116 are turned on, as in FIG. 2f. An output power threshold of SMPS 200 exists, below which the switching losses of MOSFETs 112 and 116 are increased so far that QR mode is exited and skip mode is enabled. Both MOSFETs 112 and 116 remain turned off until more power is needed to be transferred from primary side 102 to secondary side 104.

QR mode is entered by SMPS 200 when output load is reduced and magnetizing current becomes the dominating contributor to power losses in the power converter. When QR mode is entered, SMPS 200 begins to omit switching pulses in a controlled manner. After high side MOSFET 112 is switched off, HB node 122 swings between ground level and input voltage level naturally based on energy stored in resonant inductor 128 and resonance with resonant capacitor 136. QR mode of SMPS 200 omits turning on low-side MOSFET 116 when HB node 122 initially swings to a valley near ground node 108 to reduce power transferred to secondary side 104. The body diode of low-side MOSFET 116 conducts for a period of time until the energy stored in resonant inductor 128 is diminished. Thereafter, oscillation occurs between total primary side 102 inductance, e.g., primary winding 132 and resonant inductor 128, and HB node 122 capacitance, e.g., capacitor 201 and other stray capacitances of PCB 52 and transformer 130. The resonant oscillations swing HB node voltage up and down between ground and input voltages.

The amplitude of the parasitic oscillation decays with time as shown in FIG. 2f. QR mode of SMPS 200 detects peaks and valleys of the parasitic ringing and activates the opposite switch during the time when switching losses are substantially minimized. That is, low-side MOSFET 116 is activated during valleys of HB node 122 when voltage across low-side MOSFET 116 is nearly zero, and high-side MOSFET 112 is activated during peaks of HB node 122 when voltage across high-side MOSFET 112 is nearly zero. Symmetrical operation is achieved when QR mode is activated by skipping a similar number of peaks before activating high-side MOSFET 112 and valleys before activating low-side MOSFET 116. As the output power drops further, additional parasitic oscillation periods are omitted in order to further prolong off-time between driver pulses and further reduce energy transferred to secondary side 104. SMPS 200 transitions into skip mode or off-mode in cases when the load is lowered beyond levels where QR mode provides efficiency gains.

Hysteresis is used when switching between frequency modulation mode, QR mode, and skip mode so that SMPS 200 does not oscillate between two modes. Hysteresis is also used within QR mode when switching the number of valleys and peaks to skip. The threshold required for transitioning between QR mode skipping two peaks/valleys and QR mode skipping three peaks/valleys is lower than the threshold output power must meet to return back to only skipping two peaks/valleys from skipping three peaks/valleys. Skipping a similar number of peaks as valleys, alternating between turning on high-side MOSFET 112 and low-side MOSFET 116, and using a similar turn-on time between high-side MOSFET 112 and low-side MOSFET 116, results in balanced operation that reduces switching frequency at light loads.

In QR mode, the on-times of high-side MOSFET 112 and low-side MOSFET 116 continue to be controlled by current sensing and processing block 202 based on a similar comparison between FB node 160 and CS node 208 as in frequency modulation mode. In some embodiments, pulse widths of control signals 114 and 118 are increased when SMPS transitions from frequency modulation mode to QR mode. Even though on-times of MOSFETs 112 and 116 may be longer each pulse, less total power is transferred from primary side 102 to secondary side 104 over time due to pulses being omitted. In some embodiments, the feedback loop transfer characteristics with respect to current through primary winding 132, as detected at CS node 208, change slope when QR mode is activated in order to reduce gain characteristic discontinuities.

Figure 6:
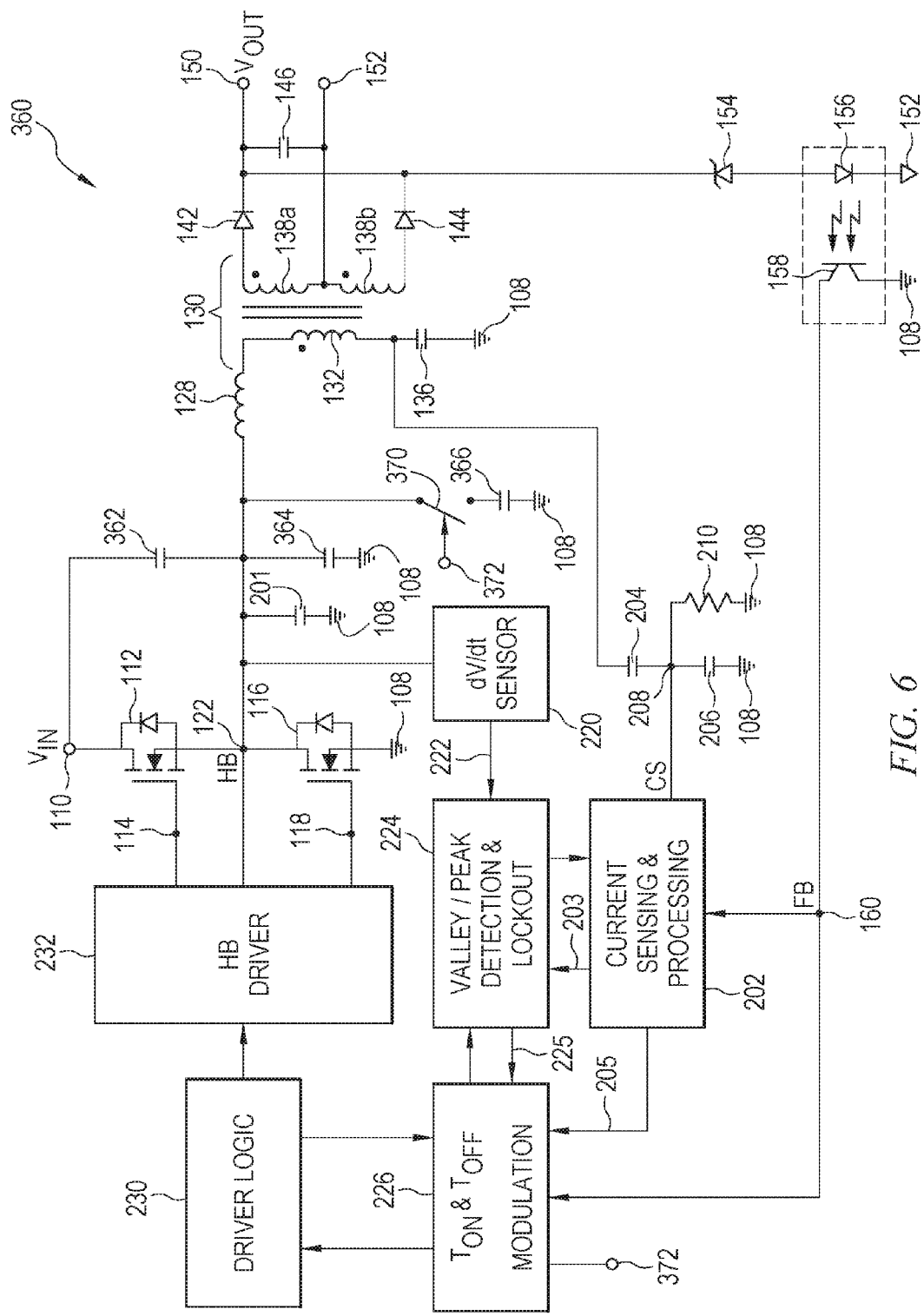
FIG. 6 illustrates an LLC resonant mode converter with QR mode and a switched resonant capacitor.

In some embodiments, there may be a desire to slow down the parasitic oscillations between capacitance of HB node 122 and total inductance connected in series on primary side 102. FIG. 6 illustrates an LLC resonant mode converter embodiment as SMPS 360 with additional capacitors coupled to HB node 122 to slow the resonant oscillations. Capacitor 362 is coupled between HB node 122 and $V_{IN}$ node 110. Capacitor 364 is coupled between HB node 122 and ground node 108. Capacitor 366 and switch 370 are coupled in series between HB node 122 and ground node 108. Control signal 372 from $T_{ON}$ and $T_{OFF}$ modulation block 226 operates switch 370. In other embodiments, control signal 372 is generated by valley/peak detection and lockout block 224.

Capacitors 362 and 364 are connected in parallel with MOSFETs 112 and 116, respectfully, and increase the total capacitance of HB node 122. The increased capacitance slows the oscillations of HB node 122 seen in FIG. 2f to increase the amount of time between pulses of control signals 114 and 118 during QR mode. With a larger capacitance of HB node 122, skipping a specific number of peaks and valleys, e.g., 4 peaks, takes a longer amount of time than with only capacitor 201. Adding capacitors 362 and 364 increases efficiency at light load by allowing more time between pulses of control signals 114 and 118. On the other hand, capacitors 362 and 364 may impact full load efficiency.

Another solution is to use switchable capacitor 366. Capacitor 366 is switchable using control signal 372 and switch 370. In one embodiment, switch 370 is a MOSFET on a common integrated circuit with the controller of SMPS 360. SMPS 360 opens switch 370 during normal frequency modulation operation because additional capacitance on HB node 122 is not desired, and potentially reduces efficiency of SMPS 360. SMPS 360 closes switch 370 during QR mode to couple capacitor 366 between HB node 122 and ground node 108. Switch 370 and capacitor 366 allow the resonant oscillation period of SMPS 360 to be extended during QR mode without a significant impact on efficiency during frequency modulation mode. Switch 370 may be opened during skip mode to reduce power consumption of SMPS 360 during very light or no load conditions. Magnetizing current, which causes a large portion of losses during light load operation is reduced, and overall efficiency is increased.

Capacitors 362, 364, and 366 are all used in one embodiment. In other embodiments, only one or two of the capacitors are added to SMPS 200 to create SMPS 360. Switch 370 and capacitor 366 are used in one embodiment without capacitors 362 and 364 to increase efficiency during light load with a lower impact on efficiency during medium and heavy loads. In other embodiments, capacitors 362 and 364 are used without capacitor 366 and switch 370. In one embodiment, switch 370 and capacitor 366 are used along with another switched capacitor coupled between $V_{IN}$ node 110 and HB node 122.

While one or more embodiments have been illustrated and described in detail, the skilled artisan will appreciate that modifications and adaptations to those embodiments may be made without departing from the scope of the present disclosure.

What is claimed:

1. A power conversion circuit, comprising:
 a first switch including a conduction terminal and a control terminal;
 a second switch including a conduction terminal of the second switch coupled to the conduction terminal of the first switch;
 a dV/dt sensor coupled to the conduction terminal of the first switch; and
 a valley/peak detection and lockout block including an input coupled to an output of the dV/dt sensor and an output of the valley/peak detection and lockout block configured to delay assertion of a control signal to the control terminal of the first switch.

2. The power conversion circuit of claim 1, wherein the valley/peak detection and lockout block further includes a counter configured to count peaks and valleys of voltage potential at the conduction terminal of the first switch based on the output of the dV/dt sensor.

3. The power conversion circuit of claim 1, further including a capacitor coupled to the conduction terminal of the first switch.

4. The power conversion circuit of claim 3, further including a third switch coupled between the capacitor and the conduction terminal of the first switch.

5. The power conversion circuit of claim 1, further including a transformer comprising a primary winding coupled to the conduction terminal of the first switch.

6. The power conversion circuit of claim 5, wherein the power conversion circuit is an LLC resonant mode converter.

7. A controller for a power conversion circuit, comprising:
 a first transistor including a conduction terminal and a control terminal;
 a second transistor including a conduction terminal and a control terminal, wherein the conduction terminal of the second transistor is coupled to the conduction terminal of the first transistor at a first node;
 a dV/dt sensor coupled to the first node to monitor peaks and valleys of a voltage at the first node; and
 a valley/peak detection circuit including an input coupled to an output of the dV/dt sensor and an output of the valley/peak detection circuit configured to delay assertion of control signals to the control terminal of the first transistor and the control terminal of the second transistor.

8. The controller of claim 7, wherein the valley/peak detection circuit further includes a counter configured to count the peaks and valleys of the voltage at the first node.

9. The controller of claim 7, further including a capacitor coupled to the first node.

10. The controller of claim 7, further including a modulation circuit having an input coupled to the output of the valley/peak detection circuit.

11. The controller of claim 10, further including a driver circuit having an input coupled to an output of the modulation circuit and an output coupled to the control terminal of the first transistor and the control terminal of the second transistor.

12. The controller of claim 7, wherein valley/peak detection circuit delays assertion of the control signal to the second transistor for a first number of valleys of the voltage at the first node after switching off the first transistor.

13. The controller of claim 7, wherein valley/peak detection circuit delays switching on the first transistor for a second number of peaks of the voltage of the first node after switching off the second transistor.

14. A method of making a semiconductor device, comprising:
 providing a first transistor including a conduction terminal and a control terminal;
 providing a second transistor including a conduction terminal and a control terminal, wherein the conduction terminal of the second transistor is coupled to the conduction terminal of the first transistor at a first node;
 providing a dV/dt sensor coupled to the first node to monitor peaks and valleys of a voltage at the first node; and
 providing a valley/peak detection circuit including an input coupled to an output of the dV/dt sensor and an output of the valley/peak detection circuit configured to delay assertion of control signals to the control terminal of the first transistor and the control terminal of the second transistor.

15. The method of claim 14, further including providing a counter configured to count the peaks and valleys of the voltage at the first node.

16. The method of claim 15, further including providing a capacitor coupled to the first node.

17. The method of claim 14, further including:
 providing a modulation circuit having an input coupled to the output of the valley/peak detection circuit; and
 providing a driver circuit having an input coupled to an output of the modulation circuit and an output coupled to the control terminal of the first transistor and the control terminal of the second transistor.

18. The method of claim 14, wherein the semiconductor device includes an LLC resonant mode converter.

19. The method of claim 14, further including delaying assertion of the control signal to the second transistor for a first number of valleys of the voltage at the first node after switching off the first transistor.

20. The method of claim 14, further including delaying switching on the first transistor for a second number of peaks of the voltage of the first node after switching off the second transistor.

* * * * *